United States Patent
Grant et al.

(10) Patent No.: US 8,286,255 B2
(45) Date of Patent: Oct. 9, 2012

(54) COMPUTER FILE CONTROL THROUGH FILE TAGGING

(75) Inventors: Calum Anders McKay Grant, Didcot (GB); Rade Todorovic, Abingdon (GB); Andrew James Thomas, Oxfordshire (GB); Richard Jacobs, Oxford (GB)

(73) Assignee: Sophos PLC, Abingdon (GB)

( * ) Notice: Subject to any disclaimer, the term of this patent is extended or adjusted under 35 U.S.C. 154(b) by 1008 days.

(21) Appl. No.: 12/187,794

(22) Filed: Aug. 7, 2008

(65) Prior Publication Data

US 2010/0037324 A1   Feb. 11, 2010

(51) Int. Cl.
*G06F 12/14* (2006.01)
*G06F 7/04* (2006.01)
*G06F 17/30* (2006.01)
*G06F 21/24* (2006.01)
*H04L 29/08* (2006.01)

(52) U.S. Cl. .............. 726/27; 726/2; 713/154; 713/165; 713/166; 713/167; 713/182

(58) Field of Classification Search .......... None
See application file for complete search history.

(56) References Cited

U.S. PATENT DOCUMENTS

| | | | | |
|---|---|---|---|---|
| 5,889,943 | A * | 3/1999 | Ji et al. | 726/22 |
| 7,000,247 | B2 * | 2/2006 | Banzhof | 726/2 |
| 7,624,435 | B1 * | 11/2009 | Huang | 726/12 |
| 7,707,635 | B1 * | 4/2010 | Kuo et al. | 726/24 |
| 2005/0177725 | A1 * | 8/2005 | Lowe et al. | 713/176 |
| 2006/0031297 | A1 * | 2/2006 | Zuidema | 709/206 |
| 2008/0222513 | A1 * | 9/2008 | Van Den Berge | 715/234 |
| 2008/0256354 | A1 * | 10/2008 | Blumenau | 713/153 |

* cited by examiner

*Primary Examiner* — David Garcia Cervetti
*Assistant Examiner* — Fatoumata Traore
(74) *Attorney, Agent, or Firm* — Strategic Patents, P.C.

(57) ABSTRACT

In embodiments of the present invention improved capabilities are described for providing data protection through the detection of tags associated with data or a file. In embodiments the present invention may provide for a step A, where data may be scanned that is intended to be communicated from the client computing facility. In response to step A, at step B, restricted data may be identified by identifying an absence of a tag associated with the data. And finally, in response to step B, at step C, an interruption to the intended communication may be caused.

25 Claims, 18 Drawing Sheets

COMPUTER FILE CONTROL THROUGH FILE TAGGING

BACKGROUND

1. Field

The present invention is related to control of computer files, and more specifically relating to control of computer files through file tagging.

2. Description of the Related Art

There are many different approaches to controlling computer files, including digital rights management (DRM), file encryption, device and hard disk encryption, and use of regular expressions for searching content. Simple regular expressions are often inaccurate when discriminating between confidential and non-confidential data, and other types of content scanning are unreliable, resulting in false-positives and false-negatives. In addition, these methods tend to interfere with normal use, intra-company communication. There exists a need for a method that allows reliable control of computer files that does not interfere with the normal intra-company communications.

SUMMARY

In embodiments, the present invention may provide for a step A, where data may be scanned that is intended to be communicated from the client computing facility. In response to the scanning step A, a step B may take place where restricted data may be identified by identifying an absence of a tag associated with the data. And finally, in response to step B, a step C may take place, where an interruption to the intended communication may be caused. In embodiments, the scanning of step A may involve scanning data intended for an outside recipient, data intended for a non-employee recipient, data intended for a recipient outside of the corporate network, outgoing email, outgoing IMs, outgoing VoIP, data intended for a recipient represented on a block list of recipients, data intended to be transferred to a removable memory, data intended to be transferred to a memory stick, data intended to be transferred to an FTP site, and the like. In embodiments, the intended communication of step A may be associated with an intended transfer of the data from the client computing facility, and so step C may be associated with the interruption of the intended transfer.

In embodiments, if the tag is identified as associated with the data to be communicated, the tag may be analyzed to determine the communication protocol. The association of the tag with the data may be that the tag is attached to the data, the tag is associated with an attachment of metadata to the data, the association of the tag with the data modifies the filename associated with the data, and the like.

In embodiments, the present invention may provide a user interface that may facilitate the tagging of data with a confidentiality tag. Further, the tagging of data, such as on the client computing facility, may be based on an event. The event may be associated with the saving of a file, the automatic saving of a file, the saving of a file by the user, the creation of the file, the scanning of the file, the scheduled scanning of the file, and the like. In addition, the scanning process or scheduled scanning process may apply tags based on a parameter, such as folder location, content, filename, date, user name, user group, and the like.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

Figure 1:
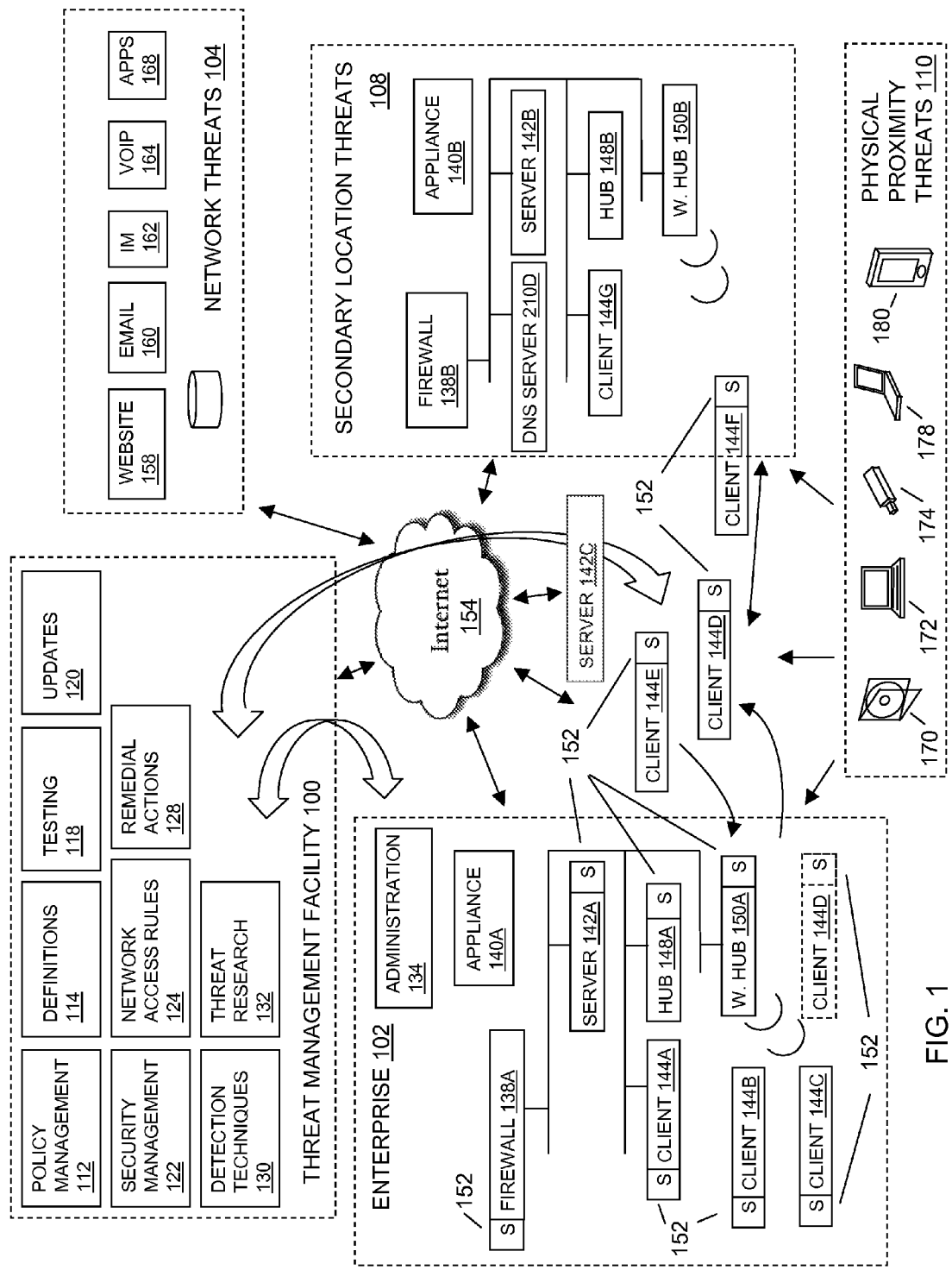
FIG. 1 depicts a block diagram of the threat management facility providing protection to an enterprise against a plurality of threats.

While the invention has been described in connection with certain preferred embodiments, other embodiments would be understood by one of ordinary skill in the art and are encompassed herein.

All documents referenced herein are hereby incorporated by reference.

DETAILED DESCRIPTION

An aspect of the present invention relates to corporate policy management and their implementation through a unified threat management facility 100. As will be explained in more detail below, a threat management facility 100 is used to protect computer assets from many threats, both computer generated threats and user generated threats. The threat management facility 100 is multi-dimensional in that it is designed to protect corporate assets from a variety of threats and it is adapted to learn about threats in one dimension (e.g. worm detection) and apply the knowledge in another dimension (e.g. spam detection). Corporate policy management is one of the dimensions for which the threat management facility can control. The corporation may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services and policy management may be offered as one of the services. We will now turn to a description of the threat management system 100.

Over recent years, malware has become a major problem across the internet 154. From both technical and user perspectives the categorization of a specific threat type, such as whether it is a virus, worm, spam, phishing exploration, spyware, adware, or the like, is becoming reduced in significance. The threat, no matter how it's categorized, may need to be stopped at all points of the enterprise facility 102, including laptop, desktop, server facility 142, gateway, and the like. Similarly, there may be less and less benefit to the user in having different solutions for known and unknown threats. As such, a consolidated threat management facility 100 may need to be applied to the same set of technologies and capabilities for all threats. The threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have lead to a rapid increase in the speed at which threats may move. Today, an unprotected PC connected to the internet 154 may be infected quickly, say within 10 minutes, which may require acceleration for the delivery of threat protection. Where once, monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include enterprise facility 102 client facility's 144 that have moved into network connectivity not directly associated or controlled by the enterprise facility 102. Threats to enterprise facility 102 client facilities 144 may come from a plurality of sources, such as from network threats 104, physical proximity threats 110, secondary location threats 108, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly with the threat management facility 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, control of unauthorized users, control of guest and non-compliant computers, and the like. The security management facility 122 may be a software application that may provide malicious code and malicious application protection to a client facility 144 computing resource. The security management facility 122 may have the ability to scan the client facility 144 files for malicious code, remove or quarantine certain applications and files, prevent certain actions, perform remedial actions and perform other security measures. In embodiments, scanning the client facility 144 may include scanning some or all of the files stored to the client facility 144 on a periodic basis, may scan applications once the application has been requested to execute, may scan files as the files are transmitted to or from the client facility 144, or the like. The scanning of the applications and files may be to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facilities 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running, whereas runtime protection may only interrupt code that has already partly executed; behavioral protection may identify malicious code at the gateway or on the file servers and deletes it before reaching end-point computers; and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities 144. The updates may be a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities 144, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide policy management facility 112 that may be able to block non-malicious applications, such as VoIP 164, instant messaging 162, peer-to-peer file-sharing, and the like, that may undermine productivity and network performance within the enterprise facility 102. The policy management facility 112 may be a set of rules or policies that may indicate enterprise facility 102 access permissions for the client facility 144, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility 144. The policy management facility 112 may include rules that may be interpreted with respect to an enterprise facility 102 network access request to determine if the request should be allowed. The rules may provide a generic rule for the type of access that may be granted; the rules may be related to the policies of an enterprise facility 102 for access rights for the enterprise facility's 102 client facility 144. For example, there may be a rule that does not permit access to sporting websites. When a website is requested by the client facility 144, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the distribution of enterprise facility 102 wide access rules and policies that may maintain control of the access of client facility 144 to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM 162 activity to only support personnel for communicating with customers. This may allow communication for departments requiring access, but may maintain the network bandwidth for other activities by restricting the use of IM 162 to only the personnel that need access to IM 162 in support of the enterprise facility 102. In an embodiment, the policy management facility 112 may be a standalone application, may be part of the policy management facility 112 network server facility 142, may be part of the enterprise facility 102 network, may be part of the client facility 144, or the like.

In embodiments, the threat management facility 100 may provide configuration management, which may be similar to policy management, but may specifically examine the configuration set of applications, operating systems, hardware, and the like, and managing changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and the update management facility 120 may be provided by the threat management facility 100. In addition, a policy management facility 112 may also require update management (e.g. as provided by the update facility 120 herein described), as the enterprise facility 102 requirements for policies change. The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility 144, the enterprise facility 102 network and/or client facility 144 may pull information from the security facility 122 and policy management facility 112 network server facilities 142, there may be a combination of pushing and pulling of information between the security facility 122 and the policy management facility 112 network servers 142, enterprise facility 102 network, and client facilities 144, or the like. For example, the enterprise facility 102 network and/or client facility 144 may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility 144 by providing notification that there are updates available for download and then transmitting the information. The combination of the security management 122 network server facility 142 and security update module may function substantially the same as the policy management facility 112 network server and policy update module by providing information to the enterprise facility 102 network and the client facility 144 in a push or pull method. In an embodiment, the policy management facility 112 and the security facility 122 management update modules may work in concert to provide all the needed information to the enterprise facility's 102 network and/or client facility 144 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The definition files may provide information that may identify malicious code within files, applications, or the like. The definition files may be accessed by security management facility 122 when scanning files or applications within the client facility 144 for the determination of malicious code that may be within the file or application. The definition files may contain a number of commands, definitions, or instructions, to be parsed and acted upon, or the like. In embodiments, the client facility 144 may be updated with new definition files periodically to provide the client facility 144 with the most recent malicious code definitions; the updating may be performed on a set time period, may be updated on demand from the client facility 144, may be updated on demand from the network, may be updated on a received malicious code alert, or the like. In an embodiment, the client facility 144 may request an update to the definition files from an update facility 120 within the network, may request updated definition files from a computing facility external to the network, updated definition files may be provided to the client facility 114 from within the network, definition files may be provided to the client facility 144 from an external computing facility from an external network, or the like.

In an embodiment, a definition management facility 114 may provide for the timely updates of definition files information to the network, client facilities 144, and the like. New and altered malicious code and malicious applications may be continually created and distributed to networks worldwide. The definition files that maintain the definitions of the malicious code and malicious application information for the protection of the networks and client facilities 144 may need continual updating to provide continual defense of the network and client facility 144 from the malicious code and malicious applications. The definition files management may provide for automatic and manual methods of updating the definition files. In embodiments, the network may receive definition files and distribute the definition files to the network client facilities 144, the client facilities 144 may receive the definition files directly, or the network and client facilities 144 may both receive the definition files, or the like. In an embodiment, the definition files may be updated on a fixed periodic basis, on demand by the network and/or the client facility 144, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility 144 having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility 144 application should be granted access to a requested network location. The network location may be on the same network as the facility or may be on another network. In an embodiment, the network access control may verify access rights for client facilities 144 from within the network or may verify access rights of computer facilities from external networks. When network access for a client facility 144 is denied, the network access control may send an information file to the client facility 144, the information file may contain data or commands that may provide instructions for the remedial action facility 128. The information sent by the network access facility 124 control may be a data file. The data file may contain a number of commands, definitions, instructions, or commands to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility 144. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites 158, controlling instant messenger 162 accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the network access rules facility 124. The network access rules facility 124 may be maintained by the network administration facility 134 using the network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules facility 124 management.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility 144 network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility 144, quarantine of the application, terminating the application, isolation of the application, isolation of the client facility 144 to a location within the network that restricts network access, blocking a network access port from a client facility 144, reporting the application to a administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility 144, and the like. This may provide the capability of not allowing a streaming file or portions of the streaming file containing malicious code from entering the client facility 144, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility 144, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility 144 computing facilities on a network. The administration facility 134 may be able to send test files to a set of client facility 144 computing facilities to test the ability of the client facility 144 to determine acceptability of the test file. After the test file has been transmitted, a recording facility may record the actions taken by the client facility 144 in reaction to the test file. The recording facility may aggregate the testing information from the client facility 144 and report the testing information to the administration facility 134. The administration facility 134 may be able to determine the level of preparedness of the client facility 144 computing facilities by the reported information. Remedial action may be taken for any of the client facility 144 computing facilities as determined by the administration facility 134; remedial action may be taken by the administration facility 134 or by the user of the client facility 144.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility 144, server facility 142, DNS server facility 210, administration facility 134, firewall 138, gateway, hubs 148, routers, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like, such as a user's desktop computer as an end-point computer, a firewall as a data evaluation end-point computer system, a laptop as a mobile end-point computer, a PDA as a hand-held end-point computer. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility 144 computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs 148, routers, server facility 142, DNS server facility 210, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility 144 computing platforms on which the end-point computer security facility 152 is adapted. A client facility 144 computing platform may be a computer system that is able to access a service on another computer, such as a server facility 142, via a network. This client facility 144 server facility 142 model may apply to a plurality of networked applications, such as a client facility 144 connecting to an enterprise facility 102 application server facility 142, a web browser client facility 144 connecting to a web server facility 142, an e-mail client facility 144 retrieving e-mail from an internet 154 service provider's mail storage servers 142, and the like. In embodiments, traditional large client facility 144 applications may be switched to websites, which may increase the browser's role as a client facility 144. Clients 144 may be classified as a function of the extent to which they perform their own processing. For instance, client facilities 144 are sometimes classified as a fat client facility 144 or thin client facility 144. The fat client facility 144, also known as a thick client facility 144 or rich client facility 144, may be a client facility 144 that performs the bulk of data processing operations itself, and does not necessarily rely on the server facility 142. The fat client facility 144 may be most common in the form of a personal computer, where the personal computer may operate independent of any server facility 142. Programming environments for fat clients 144 may include Curl, Delphi, Droplets, Java, win32, X11, and the like. Thin clients 144 may offer minimal processing capabilities, for instance, the thin client facility 144 may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility 144 may also be a mix of the two, such as processing data locally, but relying on a server facility 142 for data storage. As a result, this hybrid client facility 144 may provide benefits from both the fat client facility 144 type, such as multimedia support and high performance, and the thin client facility 144 type, such as high manageability and flexibility. In embodiments, the threat management facility 100, and associated end-point computer security facility 152, may provide seamless threat protection to the plurality of clients 144, and client facility 144 types, across the enterprise facility 102.

The enterprise facility 102 may include a plurality of server facility 142, such as application servers 142, communications servers 142, file servers 142, database servers 142, proxy servers 142, mail servers 142, fax servers 142, game servers 142, web servers 142, and the like. A server facility 142, which may also be referred to as a server facility 142 application, server facility 142 operating system, server facility 142 computer, or the like, may be an application program or operating system that accepts client facility 144 connections in order to service requests from clients 144. The server facility 142 application may run on the same computer as the client facility 144 using it, or the server facility 142 and the client facility 144 may be running on different computers and communicating across the network. Server facility 142 applications may be divided among server facility 142 computers, with the dividing depending upon the workload. For instance, under light load scenarios all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs 148, gateways, print servers 142, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility 144 to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the routers and hubs 148; at the desktop of client facility 144 computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM 162 and VoIP 164; rules for determining access to enterprise facility 102 computing resources, including authentication, levels of access, risk assessment, and usage history tracking; rules for when an action is not allowed, such as whether an action is completely denied or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities 144 within the enterprise facility 102 may be connected to the enterprise facility 102 network by way of wired network facilities 148 or wireless network facilities 150. Client facilities 144 connected to the enterprise facility 102 network via a wired facility 148 or wireless facility 150 may receive similar protection, as both connection types are ultimately connected to the same enterprise facility 102 network, with the same end-point computer security facility 152, and the same threat protected enterprise facility 102 environment. Mobile wireless facility 150 clients 144, because of their ability to connect to any wireless 150 network access point, may connect to the internet 154 outside the enterprise facility 102, and therefore outside the threat-protected environment of the enterprise facility 102. In this instance the mobile client facility 144, if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility 144 that has an embedded end-point computer security facility 152, such as by providing URI filtering in personal routers, using a web appliance as a DNS proxy, or the like. Mobile client facilities 144 that are components of the enterprise facility 102 but temporarily outside connectivity with the enterprise facility 102 network, may be provided with the same threat protection and policy control as client facilities 144 inside the enterprise facility 102. In addition, mobile client facilities 144 may receive the same interactions to and from the threat management facility 100 as client facilities 144 inside the enterprise facility 102, where mobile client facilities 144 may be considered a virtual extension of the enterprise facility 102, receiving all the same services via their embedded end-point computer security facility 152.

Interactions between the threat management facility 100 and the components of the enterprise facility 102, including mobile client facility 144 extensions of the enterprise facility 102, may ultimately be connected through the internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the internet 154 and through to the threat management facility 100. The Internet 154 however, is also the path through which threats may be transmitted from their source. These network threats may include threats from a plurality of sources, including websites 158, e-mail 160, IM 162, VoIP 164, application software, and the like. These threats may attempt to attack a mobile enterprise facility 102 client facility 144 equipped with an end-point computer security facility 152, but in embodiments, as long as the mobile client facility 144 is embedded with an end-point computer security facility 152, as described above, threats may have no better success than if the mobile client facility 144 where inside the enterprise facility 102.

However, if the mobile client facility 144 where to attempt to connect into an unprotected connection point, such as at a secondary location 108 that is not a part of the enterprise facility 102, the mobile client facility 144 may be required to request network interactions through the threat management facility 100, where contacting the threat management facility 100 may be performed prior to any other network action. In embodiments, the client facility's 144 end-point computer security facility 152 may manage actions in unprotected network environments such as when the client facility 144 is in a secondary location 108 or connecting wirelessly 150 to a non-enterprise facility 102 wireless internet 154 connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138, servers 142, clients 144, hubs 148, wireless hubs 150, and the like. As a result, the computer components of the secondary location 108 may be open to threat attacks, and become potential sources of threats, as well as any mobile enterprise facility 102 clients 144 that may be connected to the secondary location's 108 network. In this instance, these computer components may now unknowingly spread a threat to other components connected to the network.

Some threats may not come directly from the Internet 154, such as from non-enterprise facility 102 controlled mobile devices that are physically brought into the enterprise facility 102 and connected to the enterprise facility 102 client facilities 144. The connection may be made from direct connection with the enterprise facility's 102 client facility 144, such as through a USB port, or in physical proximity with the enterprise facility's 102 client facility 144 such that a wireless facility 150 connection can be established, such as through a Bluetooth connection. These physical proximity threats 110 may be another mobile computing device, a portable memory storage device, a mobile communications device, or the like, such as CDs and DVDs 170, memory stick 174, flash drive 174, external hard drive, cell phone 178, PDAs 180, MP3 players, digital cameras, point-to-point devices, digital picture frames, digital pens, navigation devices, appliances, and the like. A physical proximity threat 110 may have been previously infiltrated by network threats while connected to an unprotected network connection outside the enterprise facility 102, and when connected to the enterprise facility 102 client facility 144, pose a threat. Because of their mobile nature, physical proximity threats 110 may infiltrate computing resources in any location, such as being physically brought into the enterprise facility 102 site, connected to an enterprise facility 102 client facility 144 while that client facility 144 is mobile, plugged into an unprotected client facility 144 at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Now that the overall system has been described, we turn towards a set of embodiments for controlling data through the use of data tags. It should be understood that the following embodiments may be managed through a threat management facility 100 along with other services, such as those described herein.

The enterprise 102 may generate many documents in the course of doing business, many of which are company private or competition sensitive. In the more extreme case, a company may do work for government agencies, where generated documents may be categorized as confidential, classified, secret, and the like. When the enterprise 102 wants to control a paper version of a document they may mark the document with some appropriate indication that this document is controlled, such as specifying that the document is not to leave the company or not to be photocopied without authorization. You might even image that the enterprise 102 might 'tag' the document in some way that would sound an alarm if the document was carried out of the building or into a photo copy area. However, most documents today are generated, stored, and transferred in an electronic format, and identification and controlling the storage and movement of company sensitive electronic data may require some form of electronic data tag that can be attached to the data. In addition, because the majority of electronic data storage and transfer is within the company, any electronic tagging system may need to be unobtrusive to the normal electronic traffic within the enterprise 102. The present invention provides a way to tag electronic data. Further, the enterprise 102 may choose to associate electronic data tags only with electronic data that an enterprise 102 decides to control. For instance, the enterprise 102 may choose to only control whether the data leaves the enterprise 102, to control whether the data stays in the enterprise, is copied to some portable storage medium, and the like. In embodiments, a plurality of data tagging configurations may be implemented, such as tagging data that may not leave the enterprise, tagging data that must stay in the enterprise, tagging all data, tagging data with different categories, and the like. Therefore the present invention may provide a selected degree of control to the storage and transfer of electronic data, and in doing so, not impede the normal flow of data transfers within the enterprise 102.

In embodiments, an enterprise 102 may attach a data tag to a plurality of data types, such as text, a data file, a word processing file, a spreadsheet file, a drawing file, a presentation file, a database file, source code, executable code, software, a webpage, an image, an audio file, a multimedia file, a game, and application, and the like. The data tags may identify the associated data as at least one of a plurality of classifications, such as company confidential, company private, company secret, publicly available, sales material, company accounts, company records, personnel records, and the like. In embodiments, not all data needs to be tagged, and it may even be the case that the majority of company data does not get tagged. Files may be provided multiple tags. Data that is not controlled may be tagged as being not controlled, or not tagged at all. In embodiments, the present invention may provide a way to control company electronic data that is flexible to the needs of the enterprise 102.

In embodiments, a data tag may contain attributes associated with the data, such as the type of data, the author of the document, the date of creation, the date of last revision, the history of revisions, the history of copies made, the history of file access, the size of the document, the location history, the storage history, and the like. These attributes may be associated with the control of the data, the searching for the data, the detection of the data, for tracking purposes, for history purposes, for examination by the administrator 134, associated with a data management system, and the like.

In embodiments, a data tag may be associated with a policy of the enterprise 102, where that policy is centrally controlled, locally controlled, controlled in a distributed manner, and the like. The policy may indicate the control restrictions placed on the data, such as transfers out of the company, sending via email, sending via IM, uploading to the internet, sending information to customers, copying to a portable storage medium, storage on a personal computer, transfer to a personal computing device, and the like. In addition, the policy may indicate user privileges associated with the data, such as whether the user may access the data, store the data, transfer the data, upload the data, copy the data, copy the data onto a portable storage device, edit the data, and the like. In embodiments, the policy may be based on a sender as well as a recipient, for example, as some senders always being able to send confidential information, while other sender may never be able to send confidential information. In embodiments, the policy may assign a right to the data, such as the right to send information to customers, the right to copy the data to a CD, and the like. In embodiments, the policy may be applied to groups of users, such as company departments, management levels, users associated with a facility, and the like. For example, a user in a senior level of management may have more privileges than other members of the company, such as the ability to copy a company sensitive data onto a portable memory device in order to take it on business travel.

In embodiments, the data tags may be detected by a scanning facility, such as a security scanning facility, a client side security scanning facility, network device security scanning facility, a device security scanning facility, associated with a firewall, associated with a router, associated with a gateway, associated with a proxy server, associated with the client 144, associated with the end-point security facility, and the like. In embodiments, the scanning for data tags may not require a scanning of the content of the data. For example, the data tag may be attached to the data in a predetermined manner, such as in a predetermined location inside the data file, stored in a separate data file or stream, stored centrally in a tagging server, and the like. In embodiments, the data tag may be metadata associated with the data, a field associated with the data, embedded in the data, associated with the data header, attached to the data, associated with a hash, a label, a marker, a stamp, and the like. In embodiments, the tag may be related by filename, such as a second file, a merger document, a second file merger document, and the like.

In embodiments, the scanning facility may detect the data tag while the associated data is being accessed, transferred, copied, edited, uploaded, downloaded, transferred within the company, transferred out of the company, stored, stored onto a portable storage medium, and the like. The scanning facility, upon detection of the data tag, may compare the operation on the data associated with the data tag to restrictions specified under policy. For instance the operation on the data may be a transfer to a portable storage device, and the scanning facility's comparison reveals that this is not allowed. In embodiments, the scanning facility may take an action associated with the detection of the data tag and the comparison made, such as to deny or to allow the current operation on the data. Continuing with the example, the scanning facility may deny the transfer to the portable storage device. In addition, the scanning facility may take actions that log or alert facilities within the enterprise 102, such as logging all activity associated with the tagged data, alerting the administrator 134 when a restricted action is taking place, providing a warning to the user that this data is controlled and a logging action and/or alerting action may take place. Continuing with the example, the user and the administrator 134 may be alerted when the transfer to the portable storage device was denied. Alternatively, the data tag may indicate that the restrictions are associated with specific users, and when the transfer is requested, the user may be queried for authorization identification, or the like. In embodiments, the scanning facility may provide for a detection mechanism (i.e., noticing when restricted operations are executed), an enforcement mechanism (i.e., preventing the restricted operation), logging of activities associated with tagged data, and the like. In embodiments, the scanning facility may default to not taking any actions associated with transfers of tagged data internal to the enterprise 102, thus providing a minimum disruption to the normal flow of data within the enterprise 102. In embodiments, no action may be taken against untagged files within the enterprise, such as with internal emails, providing only enterprise perimeter enforcement, and the like.

In embodiments, tagging may be user generated in a decentralized or centralized manner, or automatically generated. For example, decentralized or centralized tagging may provide a user the ability to tag data through a user interface, where the user may select the appropriate tag with the appropriate restrictions. In addition, the process of tagging may provide for the logging of the activity. Decentralized scanning may provide the tagging facility from end-point computers within the enterprise 102, where centralized scanning may provide the tagging facility from a tagging server. In addition, the tagging facility may provide for the scanning of the data for confidential data, and for cryptographical signatures associated with the data and the tag to prevent tag forgery. In embodiments, tagging may also be performed automatically, without user intervention, such as by deducing the content or context of the data (e.g., user, program, security settings, and the like).

Figure 2:
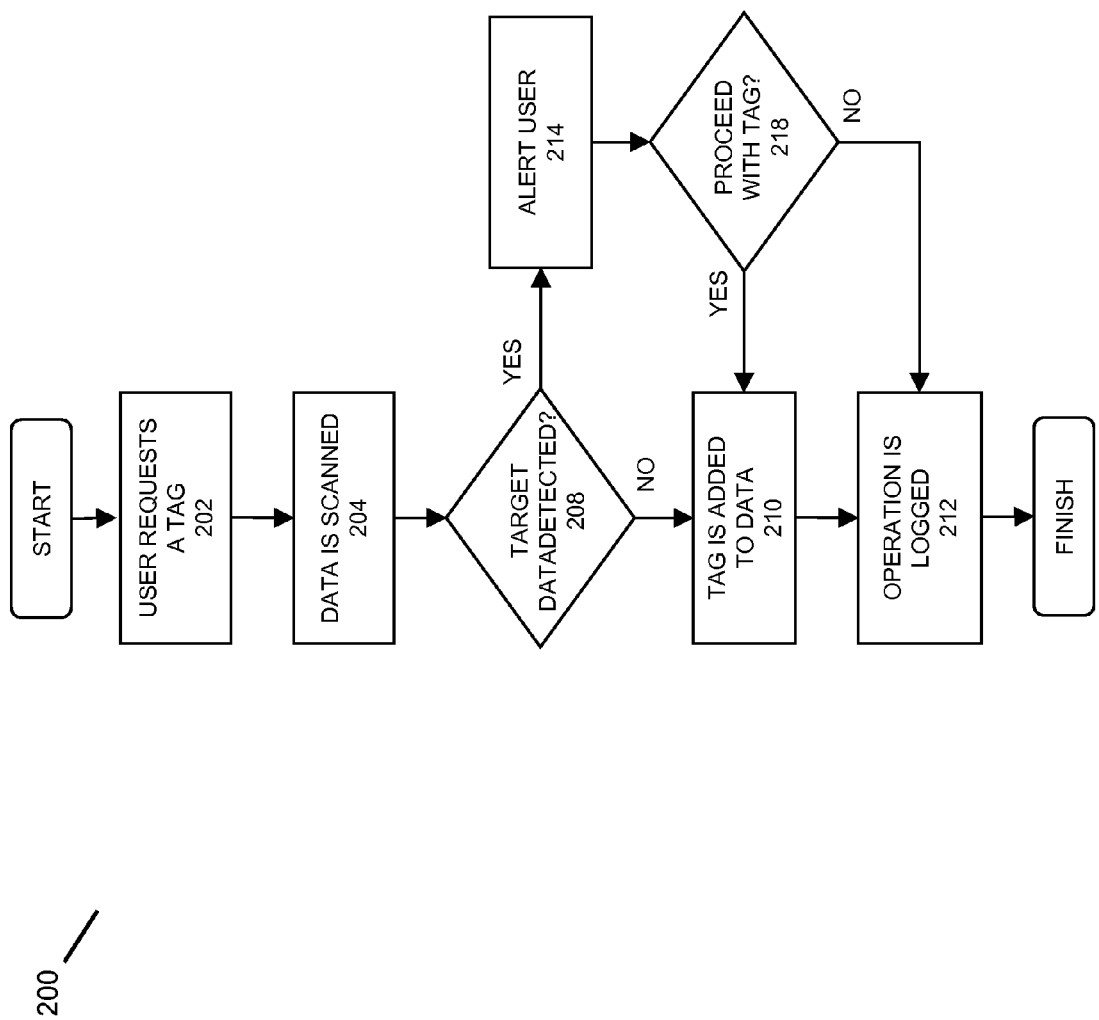
FIG. 2 depicts a process flow diagram for decentralized tagging.

Referring to FIG. 2, and in embodiments, a decentralized tagging facility process 200 is presented, where users may add tags to data utilizing a user interface. The user may be able to select the appropriate tags, where the list of tags may be configurable, and could be controlled using a central management system. When data is tagged 202, the data may be scanned for target content 204, such as confidential content. If no target data is found, then a tag may be added to the data 210, and the operation logged 212, thus finishing the process. If target data is found, then the user may be alerted 214. The user may be permitted to apply the tag anyway 218, in which case the user may choose to tag the data 210. If the user is not allowed to tag the data, or the user decides to not tag the data, then the operation is logged 212, and the process is ended.

Figure 3:
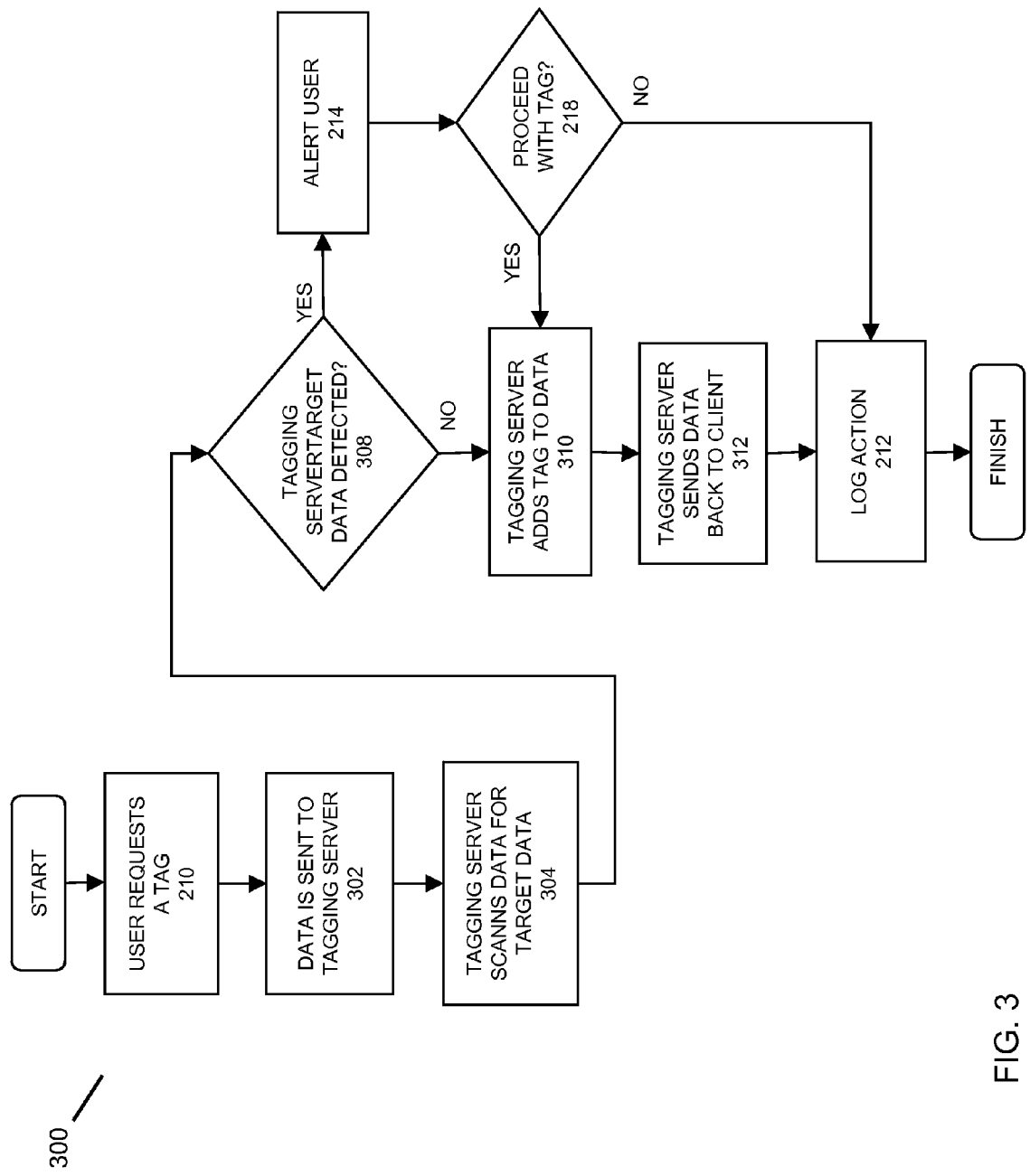
FIG. 3 depicts a process flow diagram for centralized tagging.

Referring to FIG. 3, and in embodiments, a centralized tagging facility process 300 is presented, where a central tagging server may be used. The main difference from the decentralized case may be that the tagging server may scan the data for target data, such as confidential data, log the operation, be able to cryptographically sign the data plus tag so that the tag cannot be forged, and the like. In embodiments, the user may request a tag 210, which may send the data to the tagging server 302. The tagging server may scan the data for target data 304. If target data is detected 308, then a tag may be added to the data 310, the tagged data may be sent back to the client 312 and the operation may be logged 212. If target data is detected 308, then the user may be alerted 214, and the user may have the option to tag the data anyway 218. If the user decides to tag the data 310, then the data may be tagged successfully, otherwise the operation is logged 212 and the process finishes. In embodiments, automatic tagging may include the step of a user requesting a tag 210 to be iterated by the platform or application, without user intervention, assigning the tag of appropriate type without the user needing to specify it.

Figure 4:
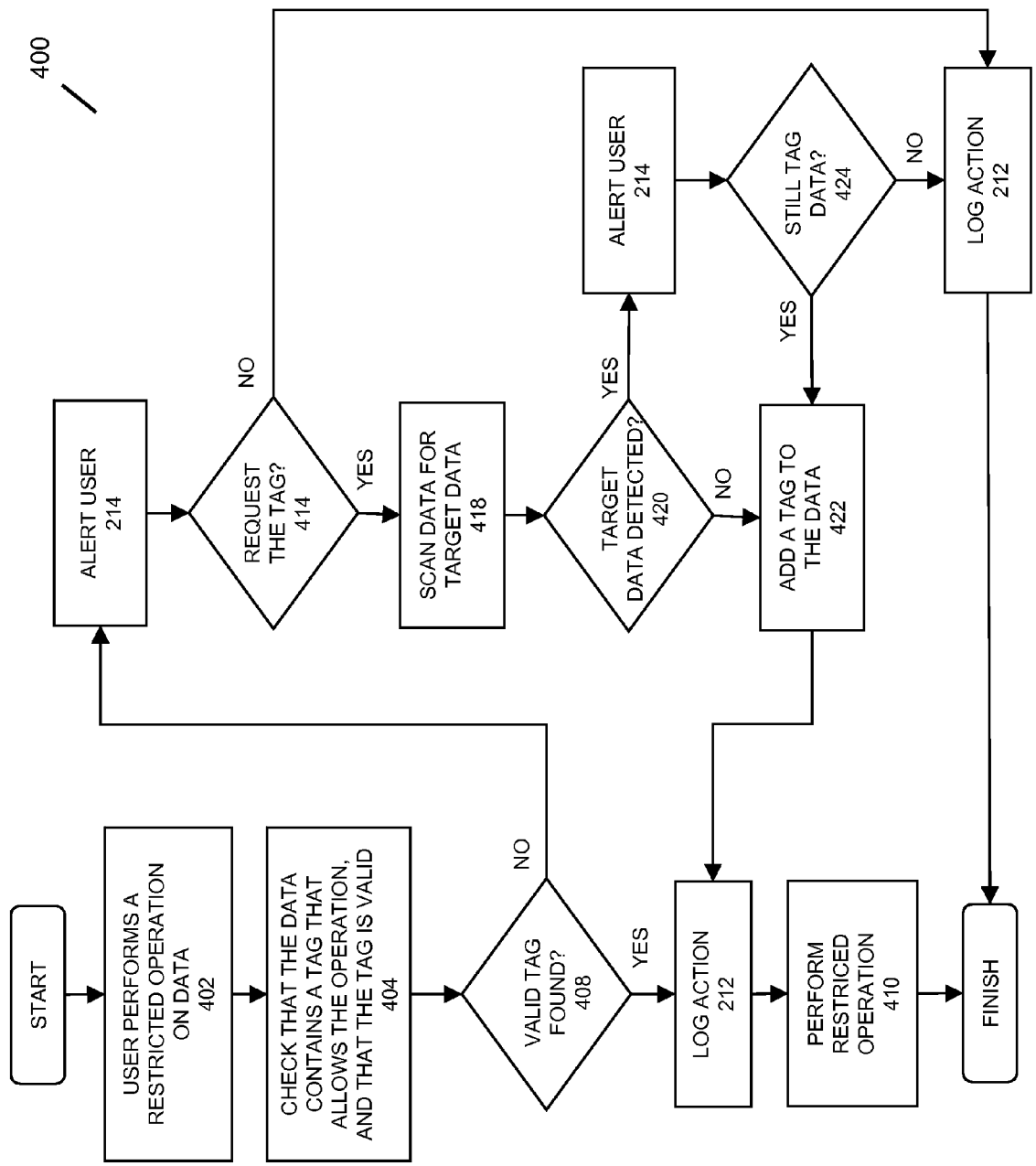
FIG. 4 depicts a process flow diagram for a restricted action.

Referring to FIG. 4, and in embodiments, a restricted operation process 400 is presented. When a user performs a restricted operation 402, the detection mechanism may detect that the operation is about to occur, and checks the data to see if it contains any tags 404. If a tag is detected that permits the operation, the tag may be verified 408 (such as via cryptographic signature), where then the operation may proceed. The operation may be logged 212 and performed 410, and the process finishes. In embodiments, the normal path for tagging may be to only log the action. If a valid tag is not found that allows the operation 408, then the user may be alerted to the problem 214. The user may be able to request a tag at this point 414. If the user decides not to request a tag, or the user is not permitted to tag, then the action may be logged 212, and the process finishes. If when prompted, the user requests a tag 414, then the data may be scanned for target data 418. If no target data is detected 420, then a tag may be added to the data 422, the operation may be logged 212, and the operation is performed 410, finishing the process.

Figure 5:
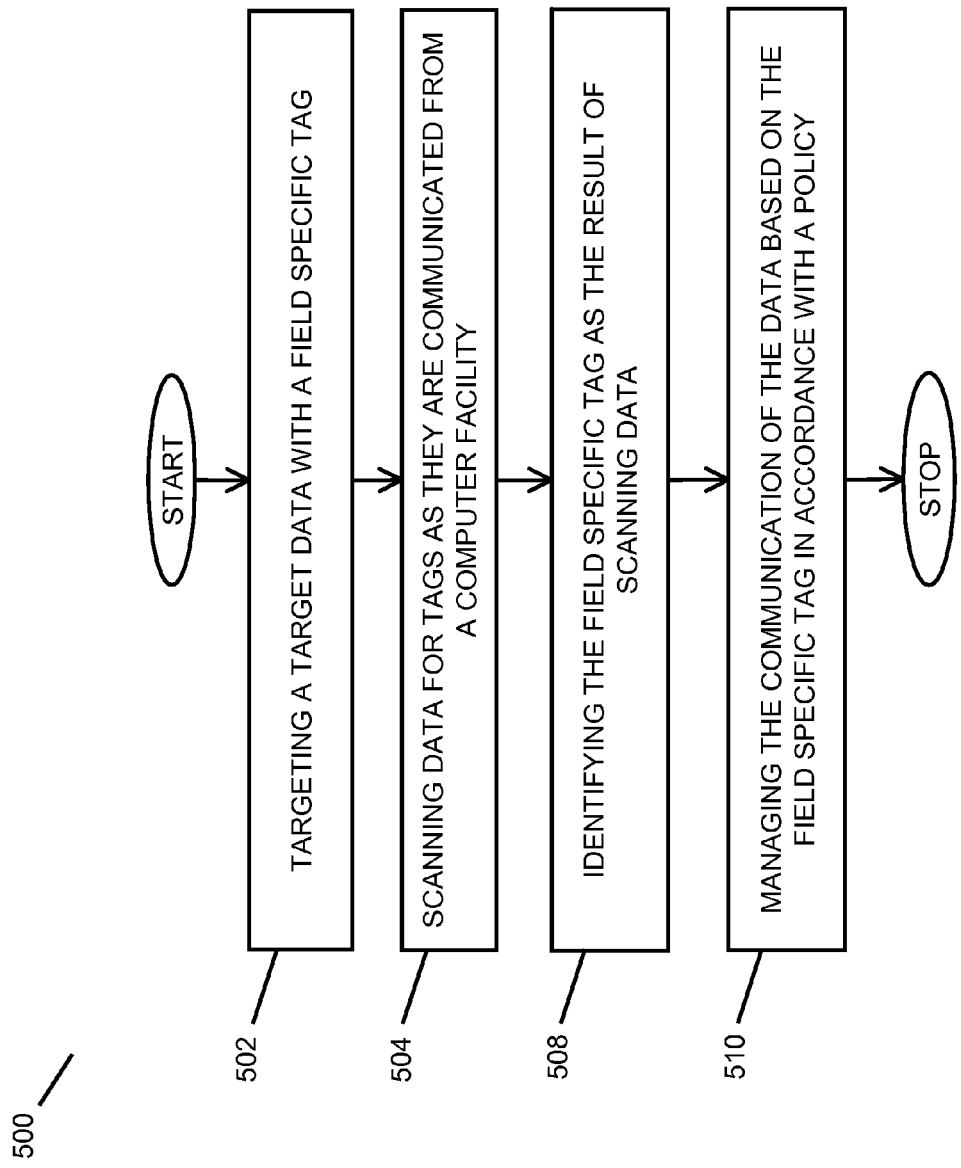
FIG. 5 depicts a process flow embodiment of the present invention for targeting data with a tag in accordance with a policy.

Referring to FIG. 5, a process flow embodiment 500 of the present invention is presented. In this embodiment, target data may be targeted with a field specific tag 502. Tags may be scanned as they are communicated from a computer facility 504. Field specific tags may be identified as the result of scanning data 508. Finally, the communication of the data based on the field specific tag may be managed in accordance with a policy 510. In embodiments, managing the communication of the data based on the field specific tag in accordance with a policy may involve blocking communication of the data, permitting the further communication of the data, generating a contingent alert before allowing further communication of the data, and the like. Further, the scanning of data for tags may be as they are communicated to the computer facility. For example, a new business presentation may be tagged as company confidential, and may not be communicated to outside the company. The scanning facility may detect the transmission of the data and block the transmission in accordance to policy. In addition, policy may dictate that the administrator 134 be notified of the attempted transmission.

Figure 6:
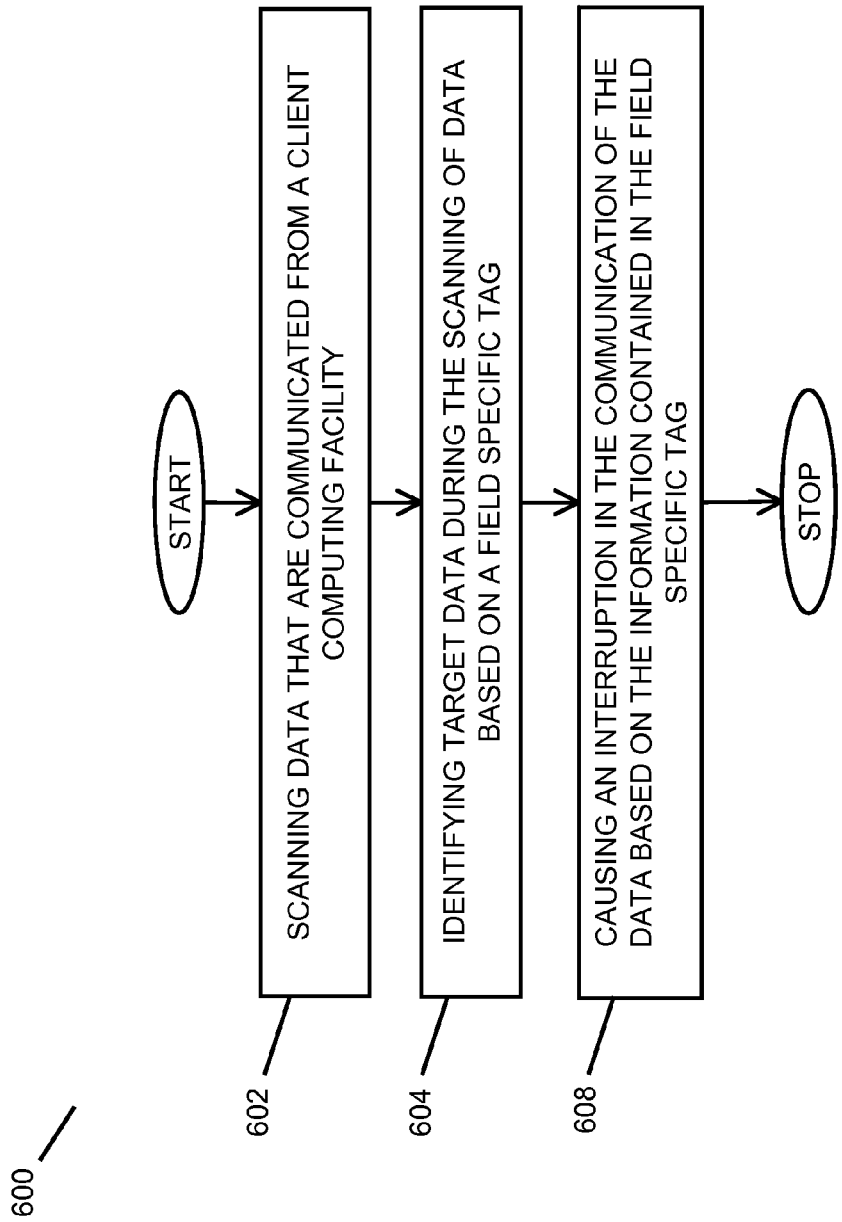
FIG. 6 depicts a process flow embodiment of the present invention for identifying target data and interrupting communication based on the content of a tag.

Referring to FIG. 6, a process flow embodiment 600 of the present invention may be presented. In this embodiment, data may be scanned that is communicated from a client computing facility 602. Target data may be identified during the scanning of data based on the information contained in the field specific tag 608. In embodiments, the field specific tag may contain information identifying the data as company confidential, where the interruption may persist until the user confirms that it is permissible to communicate the data. If communication of the data continues, an alert may be sent to an administrator 134 for logging of a confidential information communication event, where the event may include information pertaining to the computer facility and a user associated with the computer facility. The interruption may persist if the communication is a communication to an unapproved recipient. The information identifying the data as company confidential may include a level of confidentiality. In addition, the scanning of data that is communicated from the client 144 may involve scanning all data that is communicated from the client 144 to an outside network recipient. For example, a user may attempt to transmit company private personnel documents to outside the company. The scanner may detect the tag in the documents being transmitted, and interrupt the transmission, asking the user to confirm that they have authority to do so, such as through the entry of a password or the like. If the user persists in attempts to transmit the personnel data, the administrator 134 may be alerted. In embodiments, information associated with the transmission, or with the tag itself, may indicate where the data is being transmitted to, such as a tag that provides a memory storage history.

Figure 7:
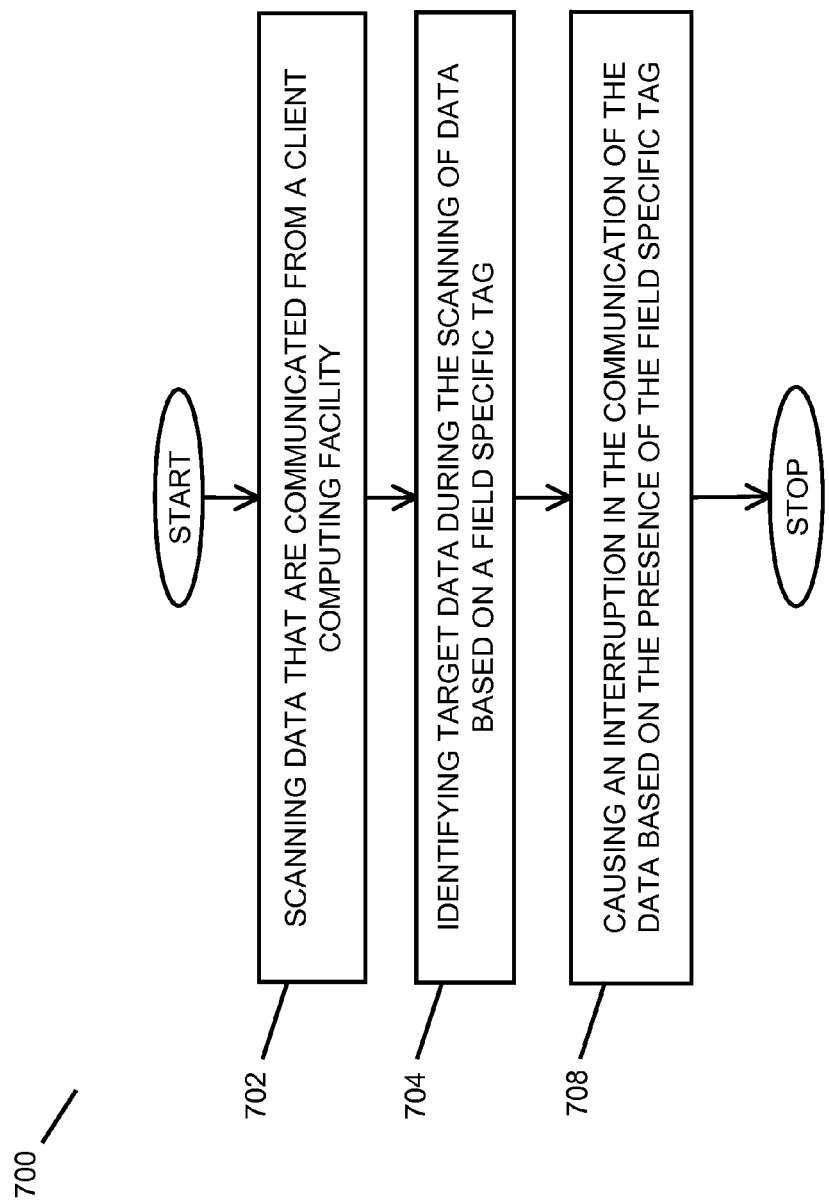
FIG. 7 depicts a process flow embodiment of the present invention for identifying target data and interrupting communication based on the presence of a tag.

Referring to FIG. 7, a process flow embodiment 700 of the present invention may be presented. In this embodiment, data may be scanned that is communicated from a client computing facility 702. Target data may be identified during the scanning of data based on a field specific tag 704. An interruption may be caused in the communication of the data based on the presence of the field specific tag 708. For example, a data file may contain a tag that indicates that the data may not be emailed. The scanner then detects the tag within an attachment of an email, and blocks the transmission of the attachment.

Figure 8:
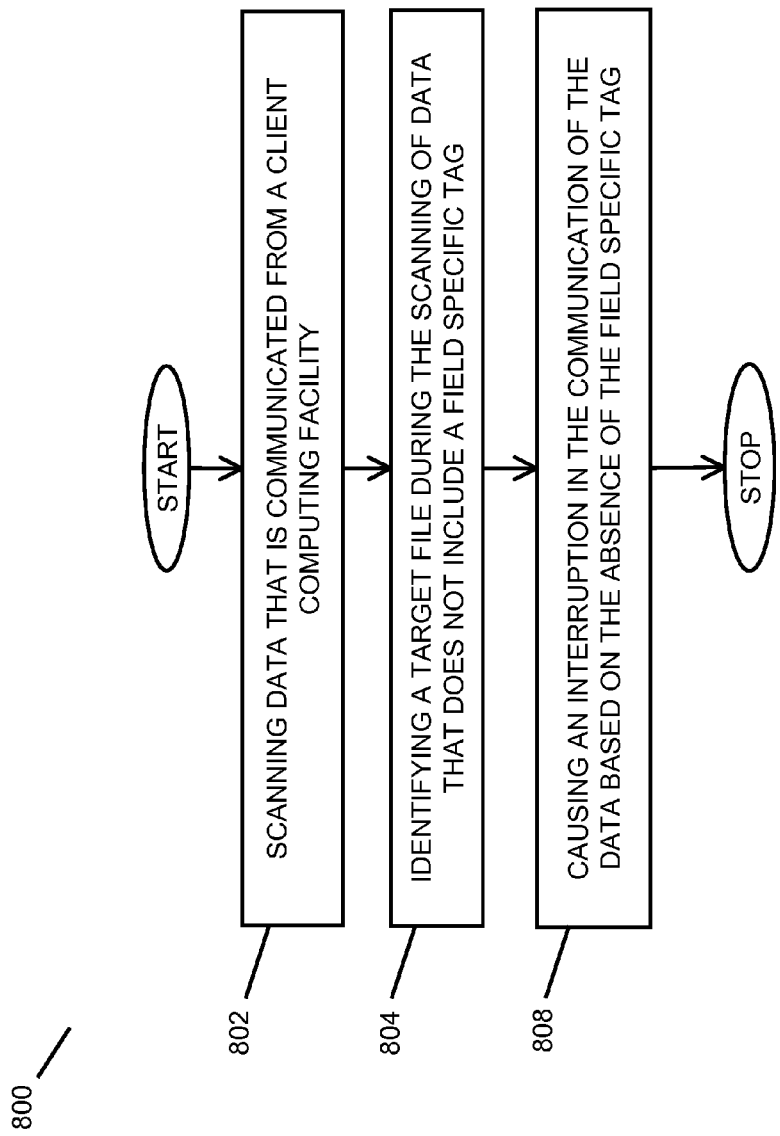
FIG. 8 depicts a process flow embodiment of the present invention for identifying target data and interrupting communication based on the absence of a tag.

Referring to FIG. 8, a process flow embodiment 800 of the present invention is presented. In this embodiment, data may be scanned that is communicated from a client computing facility 802. Target data may be identified during the scanning of data that may not include a field specific tag 804. An interruption in the communication of the data may be caused based on the absence of the field specific tag 808. For example, an enterprise 102 may have implemented a tagging system that requires all data to be tagged, even if the tag indentifies the data as having no restrictions. However, under this system, data that has no tag may be regarded as suspicious, and policy may dictate some action, such as blocking the transmission of the data. In embodiments, the user may be notified that the data could not be communicated because it had not been tagged. In embodiments, the enterprise may implement a policy where only the documents that are to be allowed to be sent externally are tagged (i.e., data with no tag may be restricted).

Figure 9:
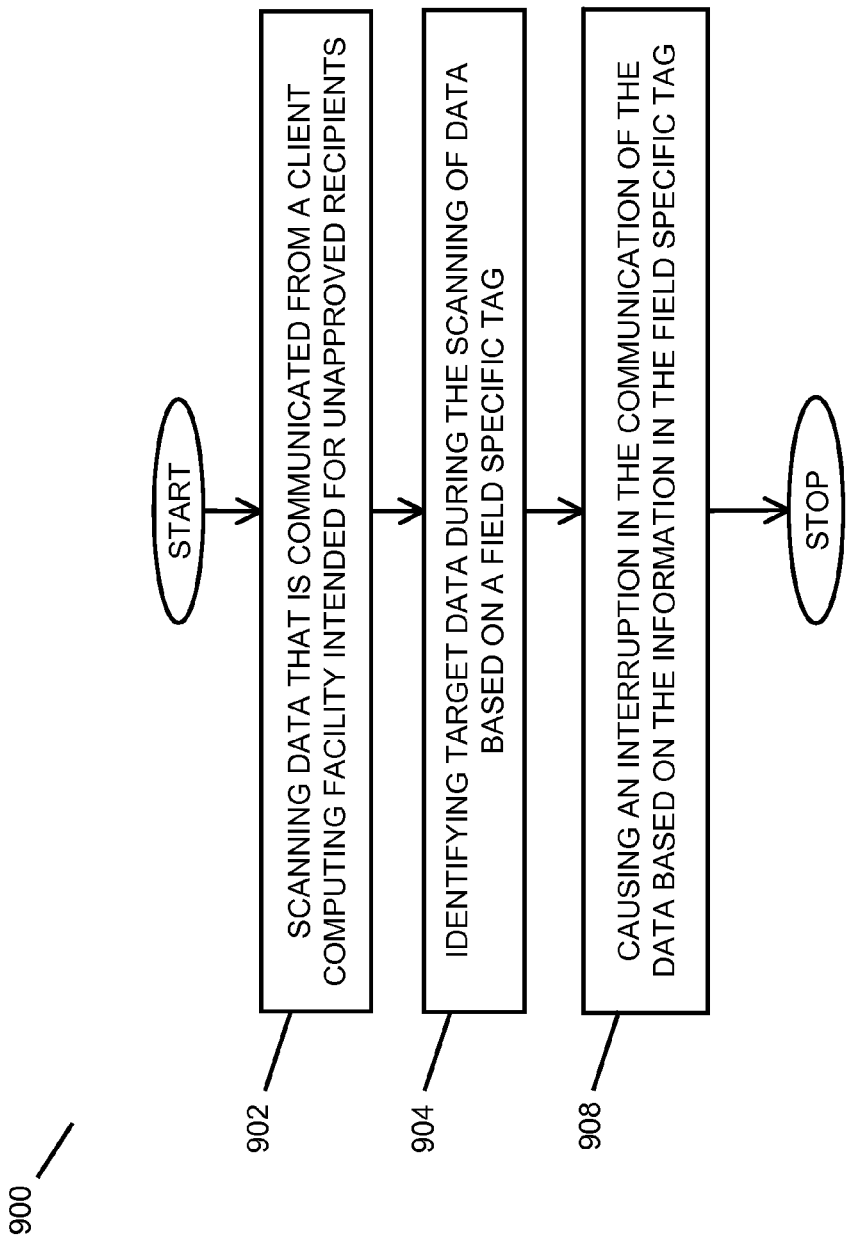
FIG. 9 depicts a process flow embodiment of the present invention for scanning data communicated to an unapproved recipient and based on information in the tag.

Referring to FIG. 9, a process flow embodiment 900 of the present invention is presented. In this embodiment, data may be scanned that is communicated from a client computing facility intended for unapproved recipients 902. Target data may be identified during the scanning of data based on a field specific tag 904. An interruption in the communication of the data may be caused based on the information in the field specific tag 908. In embodiments, communicating from the client 144 may involve emailing from the client 144, IMing from the client 144, VoIPing from the client 144, storing to a removable memory device from the client 144, uploading from the client 144, uploading from the client 144 to an FTP site, uploading from the client 144 through HTTP protocol. The scanning facility may be a client 144 based security facility adapted to scan data for compliance with a corporate policy, where the scanning facility may be further adapted to scan all outgoing email, all incoming email, and the like. Unapproved recipients may be non-company employees, recipients not listed on a white list, recipients listed on a block list, and the like. In embodiments, the field specific tag may indicate that the data is confidential data. For example, personnel records of a company may not be authorized for transmission to any client 144 that is not under the control of either the human resources department or a high level manager. Information in the tag may indicate this company policy. So, if any transmission of personnel records was attempted to an unapproved recipient, the scanning facility would interrupt the communication. In embodiments, policy may dictate further actions, such as alerting the administrator 134 and the personnel department of the attempted transmission.

Figure 10:
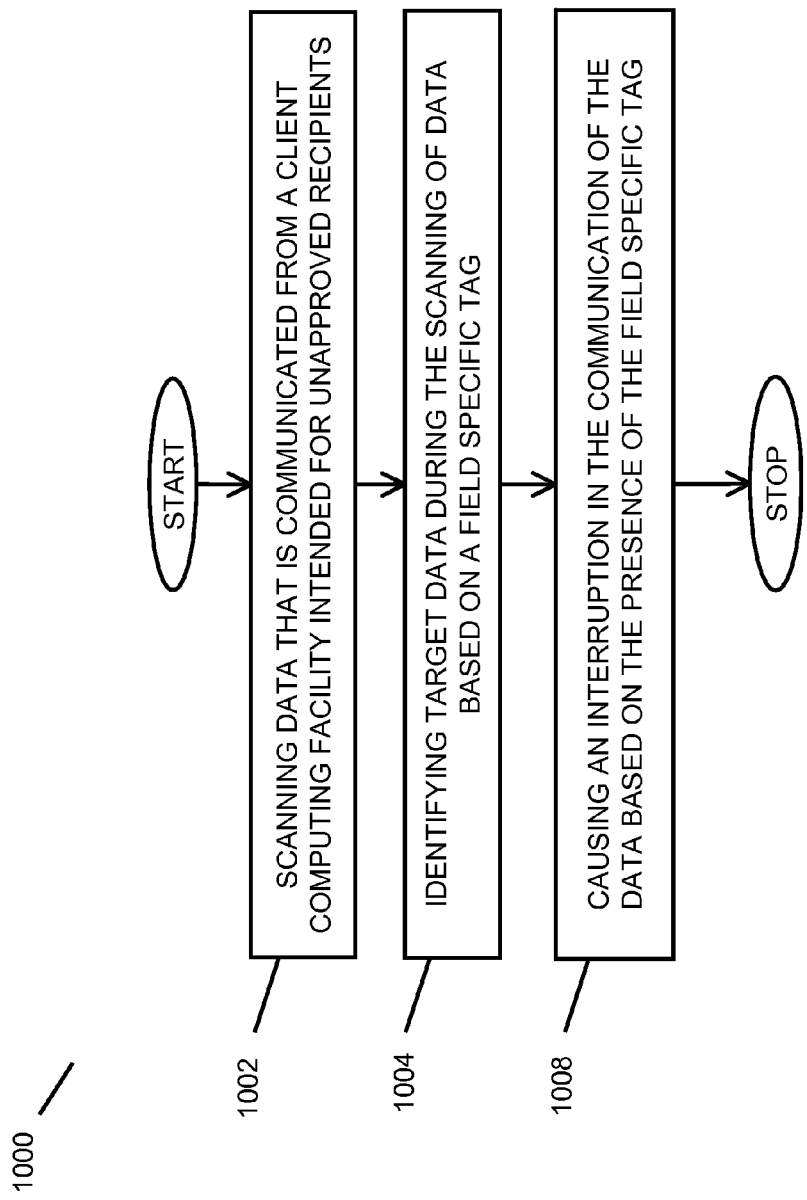
FIG. 10 depicts a process flow embodiment of the present invention for scanning data communicated to an unapproved recipient and based on the presence of a tag.

Referring to FIG. 10, a process flow embodiment 1000 of the present invention may be presented. In this embodiment, data may be scanned that is communicated from a client computing facility intended for unapproved recipients 1002. Target data may be identified during the scanning of data based on a field specific tag 1004. An interruption in the communication of the data may be caused based on the presence of the field specific tag 1008. For example, an enterprise 102 may have a tagging system that only tags data that may not be transmitted outside the enterprise 102. Now, if the scanning facility detects the presence of a tag, the scanning facility may block the transmission based on the presence of the tag. In this instance, the policy may include blocking all tagged data transmissions to outside the enterprise 102.

Figure 11:
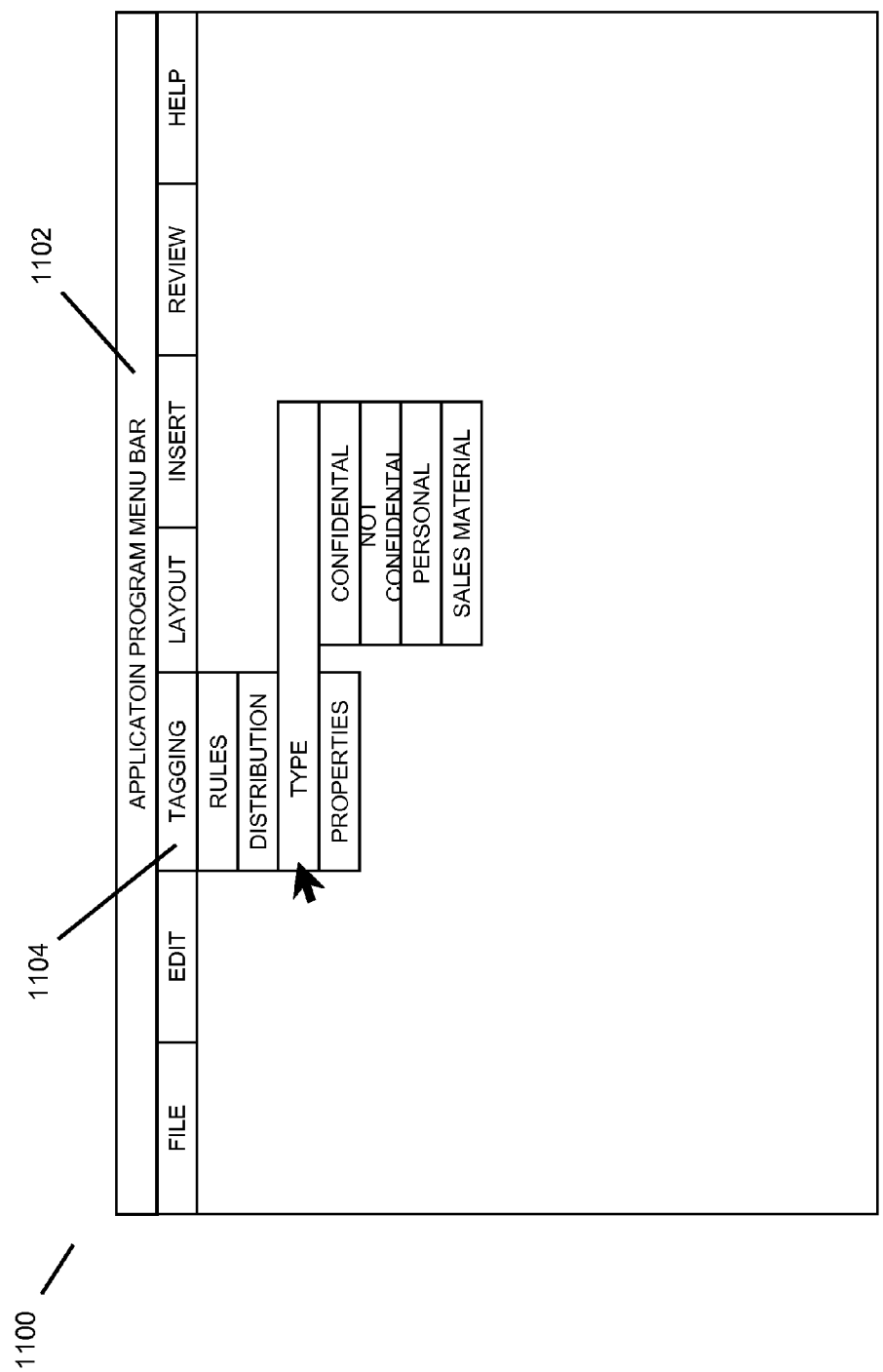
FIG. 11 depicts an embodiment of a user interface as depicted in an application program.

Referring to FIG. 11, an embodiment of a user interface 1100 is depicted in association with an application program. In embodiments, a user may be provided a user interface that is integrated into an application program of a computing facility, where the user interface may facilitate the tagging of data as confidential in nature such that a tag scanning facility may identify a resultant tag and cause an action to be taken. In addition, the action taken may be in compliance with a corporate policy relating to a communication of confidential information, where a corporate policy may be defined, managed, encoded, distributed interpreted, and the like, by computer systems which assist in enforcing the corporate policy. The application program may be any of a plurality of computer applications, such as a word processing program, a spreadsheet program, a presentation generating program, an email program, an IM program, an SMS program, a financial program, a product design program, a drawing program, an image processing program, and the like. The data being tagged may be a file produced by the application program, data in a file produced by the application program, and the like. In embodiments, the user interface may associated with the application program and be provided through a menu item, a toolbar item, a right-click menu item, a drop-down list, a checkbox, a radio button, and the like. For example, FIG. 11 depicts an application program with tagging functionality integrated into the application program's menu bar 1102.

Here, the user may be utilizing a tagging drop-down menu 1104 to select a type of tag to be applied to the document being currently edited, such as confidential, non confidential, personal, sales material, and the like. This is but one example of how an application program may provide tagging functionality, and one skilled in the art will appreciate that this type of integrated functionality may be implemented in a variety of other ways.

Figure 12:
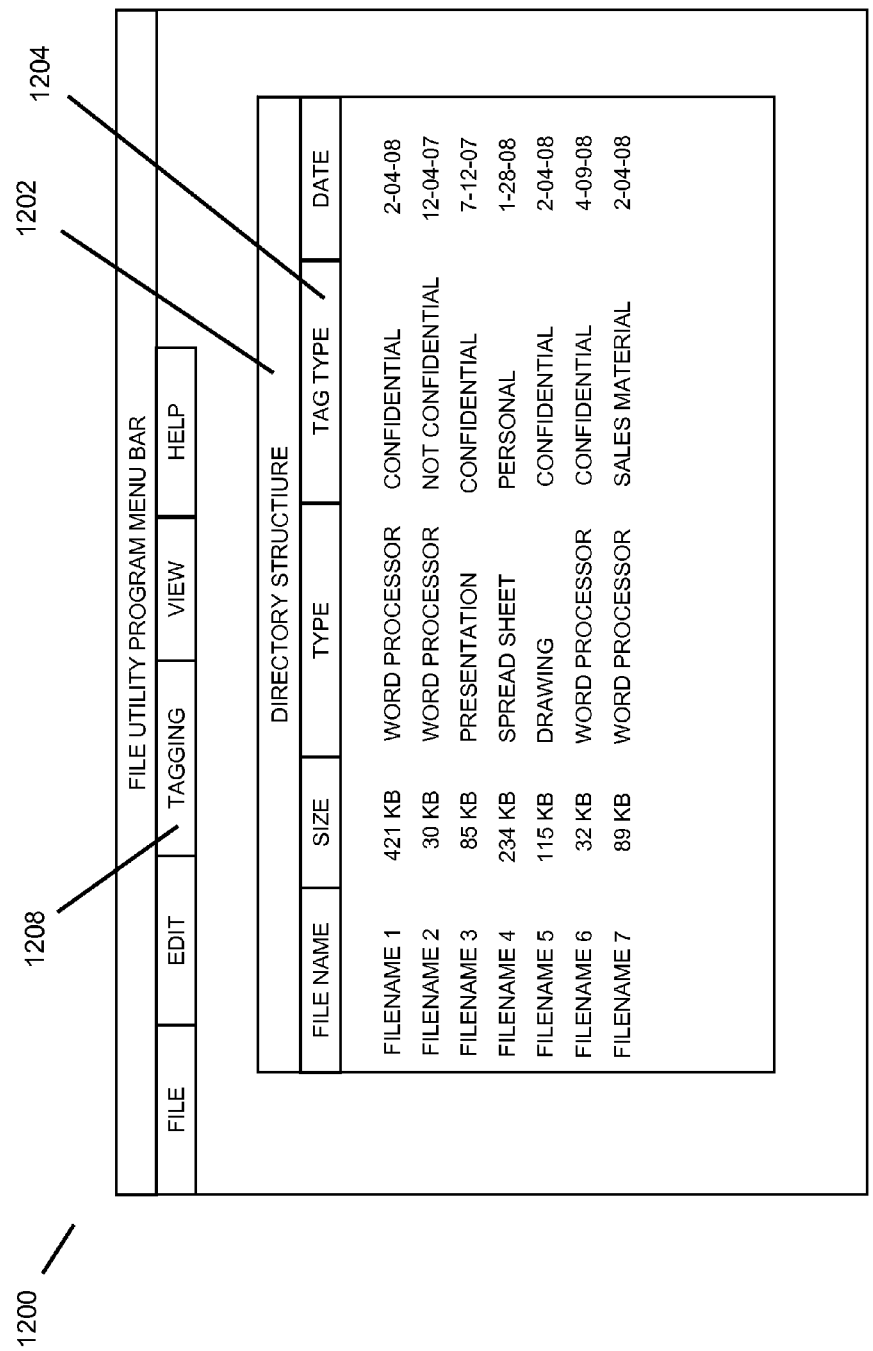
FIG. 12 depicts an embodiment of a user interface as depicted in a file utility program menu bar.

Referring to FIG. 12, an embodiment of a user interface 1200 is depicted in association with a file utility program menu bar. In embodiments, a user may be provided a user interface that is associated with file utility program for use on a computing facility, where the user interface may facilitate the tagging of data as confidential in nature such that a tag scanning facility may identify a resultant tag and cause an action to be taken. In addition, the action taken may be in compliance with a corporate policy relating to a communication of confidential information. The file utility program may present data with a directory and the user interface may facilitate the tagging of the data presented within a directory, may present a directory within the directory structure as data and the user interface facilitates the tagging of a directory within the directory structure such that all files associated with the tagged file may become tagged themselves, and the like. In addition, the user interface that facilitates the tagging may be presented in association with the file utility program, as a stand-alone feature, or the like. For example, FIG. 12 depicts a file utility program with integrated tagging functionality. Here, a directory structure 1202 is presented where the tagging type 1204 is provided along with other file information, such as filename, file size, file type, date of last modification, and the like. The file utility program may provide tagging functionality as part of its menu bar, such as through a tagging drop down menu 1208 as illustrated. This is but one example of how a file utility program may provide tagging functionality, and one skilled in the art will appreciate that this type of integrated functionality may be implemented in a variety of other ways.

Figure 13:
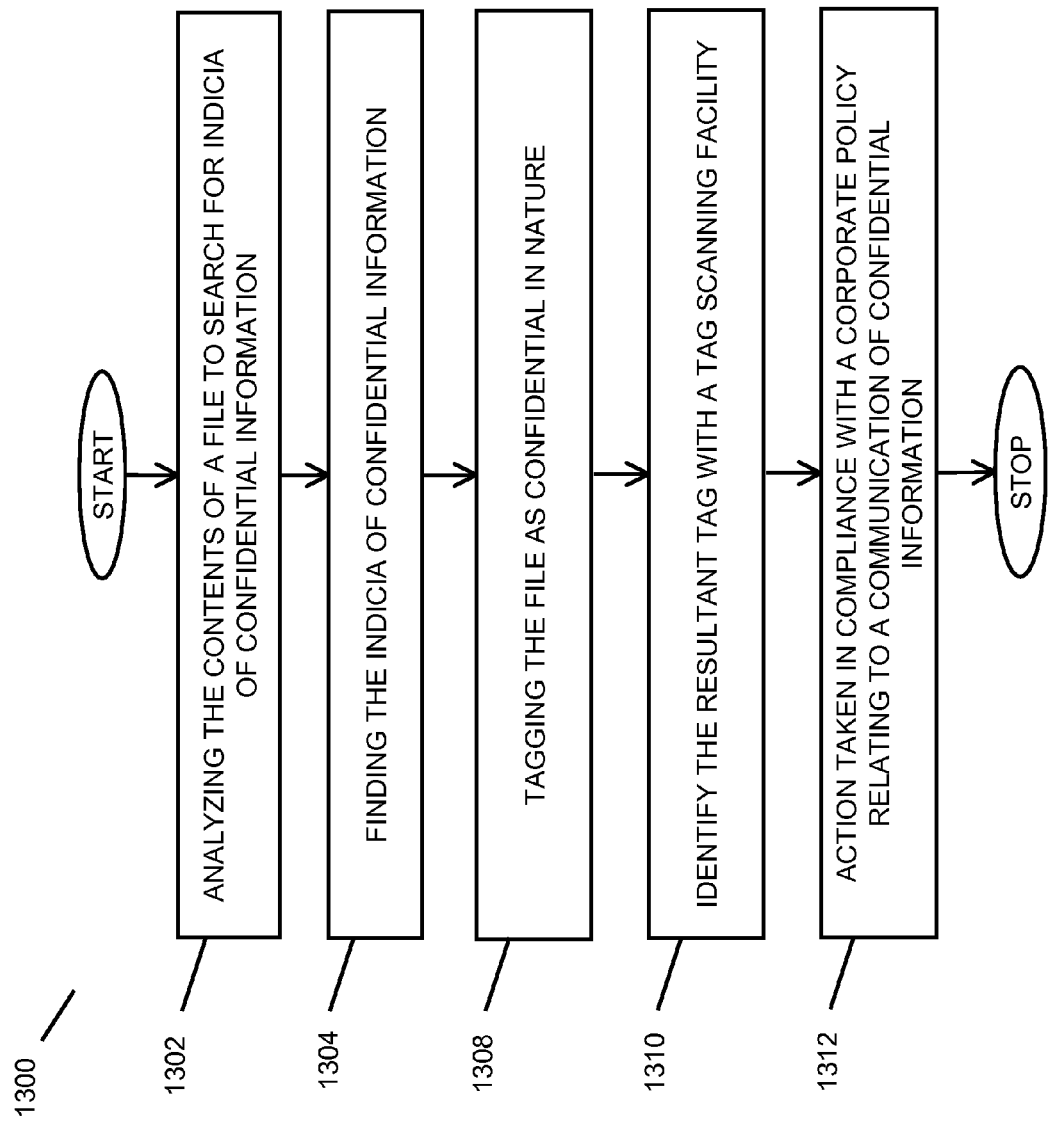
FIG. 13 depicts a process flow embodiment of the present invention for tagging a document based on analyzing the contents of a file for indicia of confidential information.

In an embodiment, FIG. 13 depicts a process flow embodiment 1300 of the present invention for tagging a document based on analyzing the contents of a file for indicia of confidential information 1302. In response to finding the indicia of confidential information 1304, the file may be tagged as confidential in nature 1308 such that a tag scanning facility will identify the resultant tag 1310. In addition, that identification of the resultant tag may cause an action, such as to be taken in compliance with a corporate policy as relating to a communication of confidential information 1312. The indicia of confidential information may be the presence of a term such as confidential, the presence of a term that is synonymous with the term confidential, the presence of a term identified by a corporate policy, and the like. The indicia of confidential information may be contextual information that identifies the information as confidential in nature, such as information in the subject line of a memo or email, the name of the file, the distribution list associated with the document, the department or individual creating the information, and the like.

In embodiments, there may be a plurality of algorithms for determining the presence of a tag, such as through the identification of a tag indicating confidential information is present, including clustering, automatic classification, machine learning, and the like. The indicia of confidential information may be found by judging a similarity with other documents, such as where similarity is measured by cosine similarity, based on Dice coefficient, based on Jaccard coefficient, based on fragments of text found in the documents, and the like. In embodiments, indicia may be associated with confidential information as a content condition, such as a regular expression, a rule consisting of regular expressions, and the like. In embodiments, the indicia of confidential information may be determined by a classifier, such as a Naïve Bayesian classifier, and the like.

Figure 14:
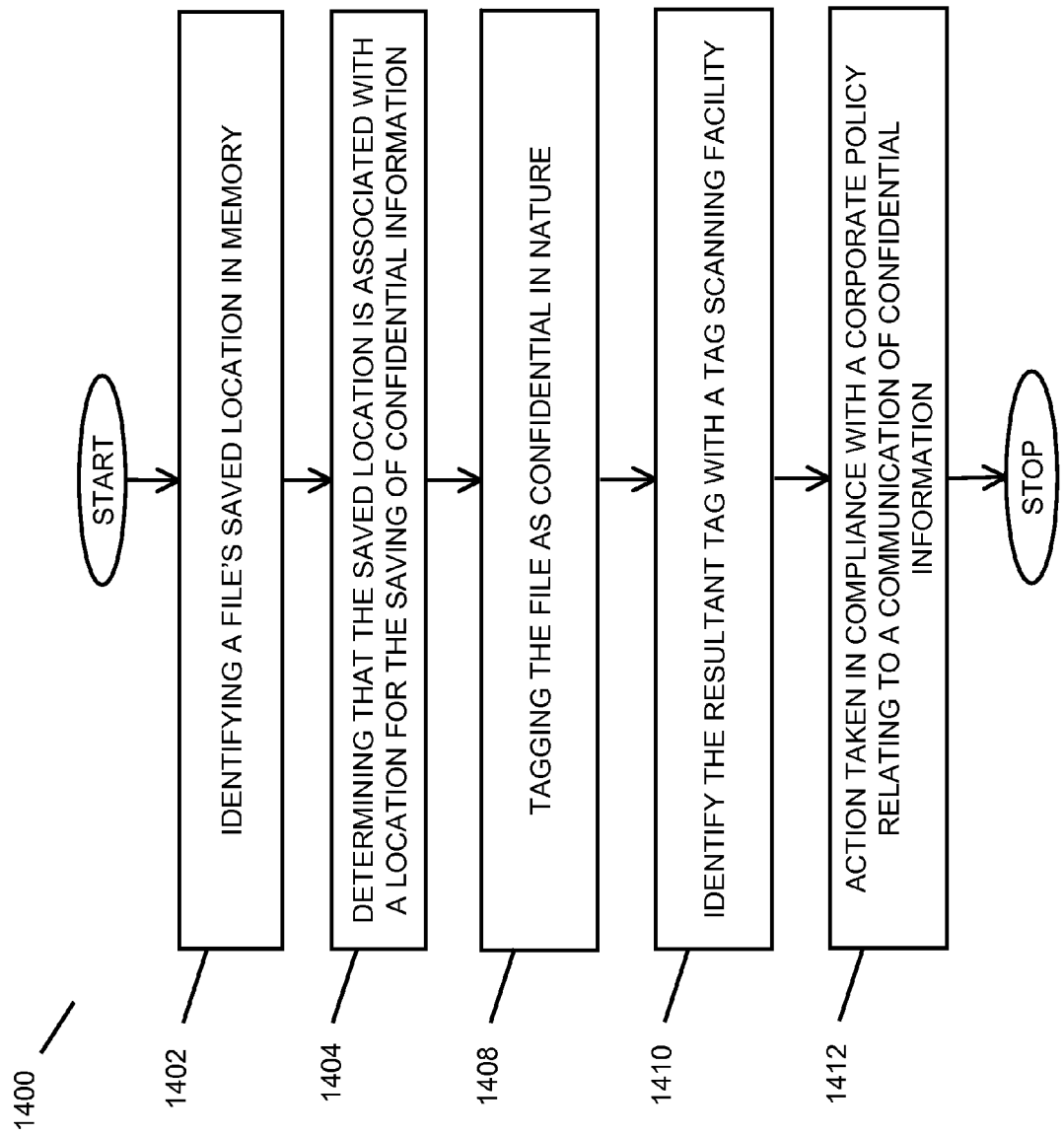
FIG. 14 depicts a process flow embodiment of the present invention for tagging a document based on the location of the file.

In an embodiment, FIG. 14 depicts a process flow embodiment 1400 of the present invention for tagging a document based on the location of the file. A file's saved storage location may be identified 1402, that may determine that the saved location is associated with a location for the saving of confidential information 1404. In response to this determination, the file may be tagged as confidential in nature 1408 such that a tag scanning facility identifies the resultant tag 1410. In addition, the identification of the resultant tag may cause an action to be taken, such as in compliance with a corporate policy relating to a communication of confidential information 1412. In embodiments, the saved location may be a file folder, a directory location, a storage device, a portable memory device, and the like.

Figure 15:
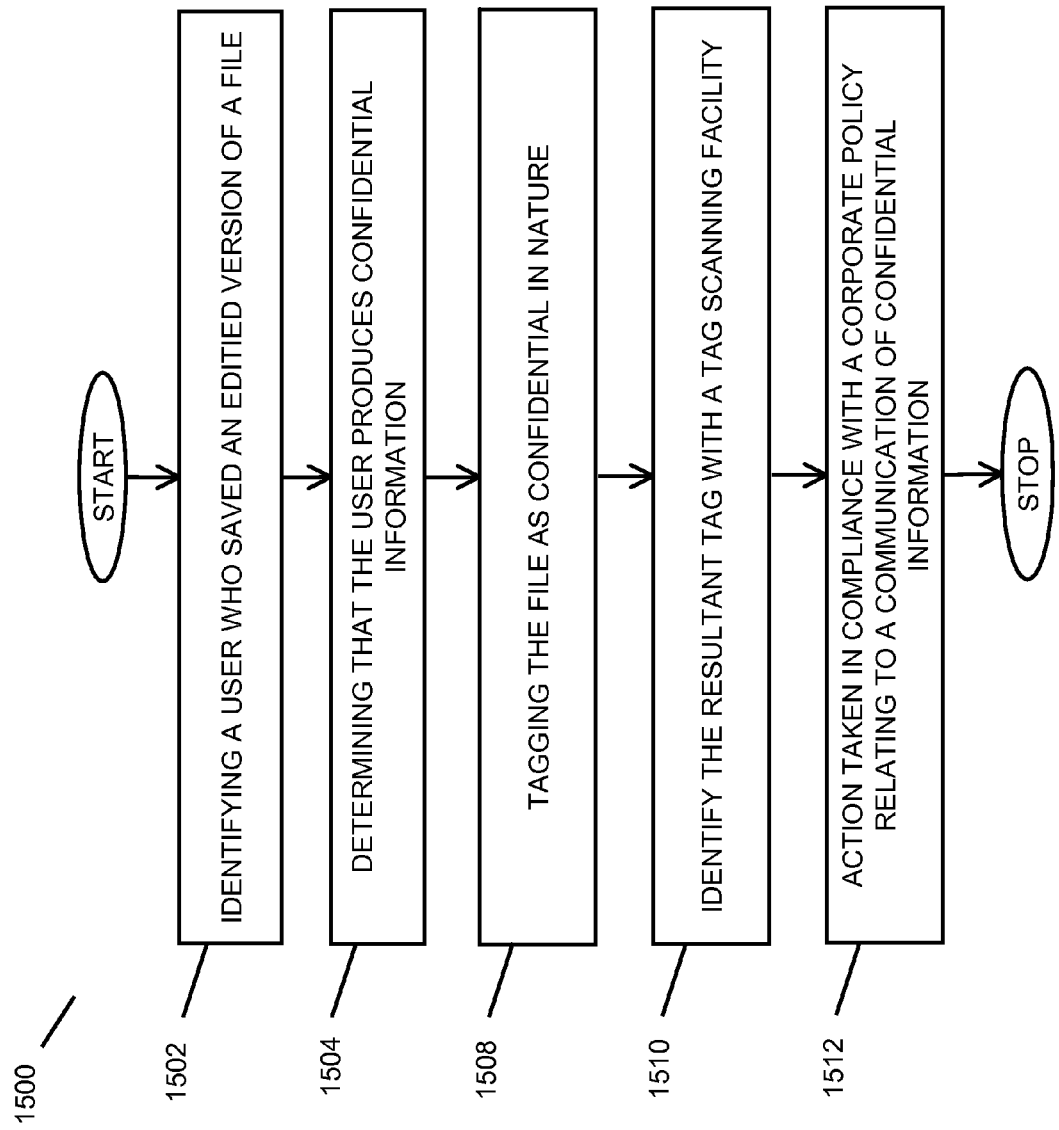
FIG. 15 depicts a process flow embodiment of the present invention for tagging a document based on the user saving the file.

In an embodiment, FIG. 15 depicts a process flow embodiment 1500 of the present invention for tagging a document based on the user saving the file 1502. A user who saved and edited version of a file may be identified 1504, and determined to be a user that produces confidential information. In response to this determination, the file may be tagged as confidential in nature 1508 such that a tag scanning facility identifies the resultant tag 1510. In addition, the identification of the resultant tag may cause an action to be taken, such as in compliance with a corporate policy relating to a communication of confidential information 1512. In embodiments, the user may be identified in a corporate policy, may be a user that produces confidential information, may belong to a group that produces confidential information, and the like.

Figure 16:
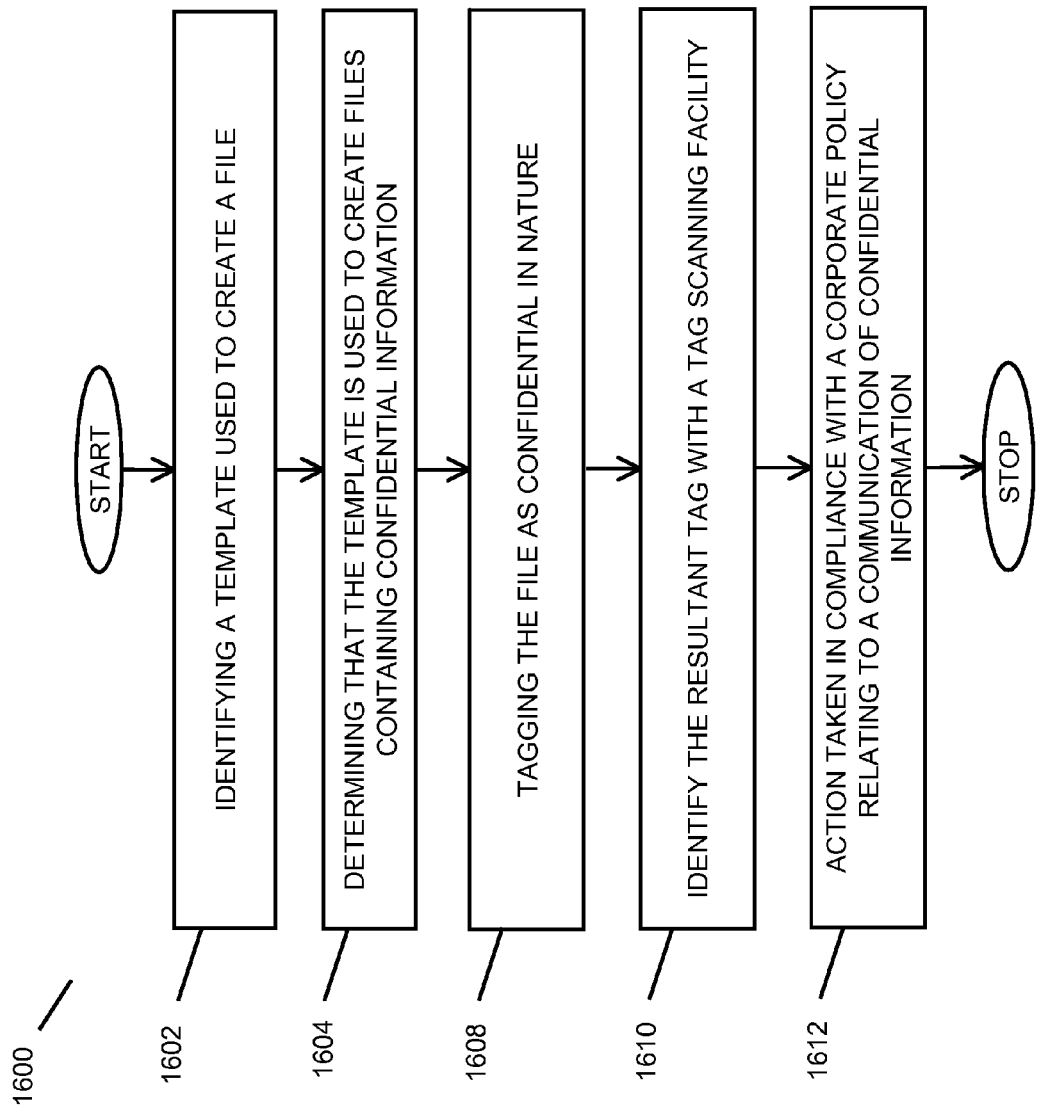
FIG. 16 depicts a process flow embodiment of the present invention for tagging a document based on a template used in creating the file.

In an embodiment, FIG. 16 depicts a process flow embodiment 1600 of the present invention for tagging a document based on a template used in creating the file. A template may be used to create a file 1602, and this template may be used to create files containing confidential information 1604. In response to this determination, the file may be tagged as confidential in nature 1608 such that a tag scanning facility identifies the resultant tag 1610. In addition, the identification of the resultant tag may cause an action to be taken, such as in compliance with a corporate policy relating to a communication of confidential information 1612. In embodiments, the template may be identified in a corporate policy. In embodiments, the file may be tagged as confidential, non-confidential, confidential in nature, non-confidential in nature, and the like.

Figure 17:
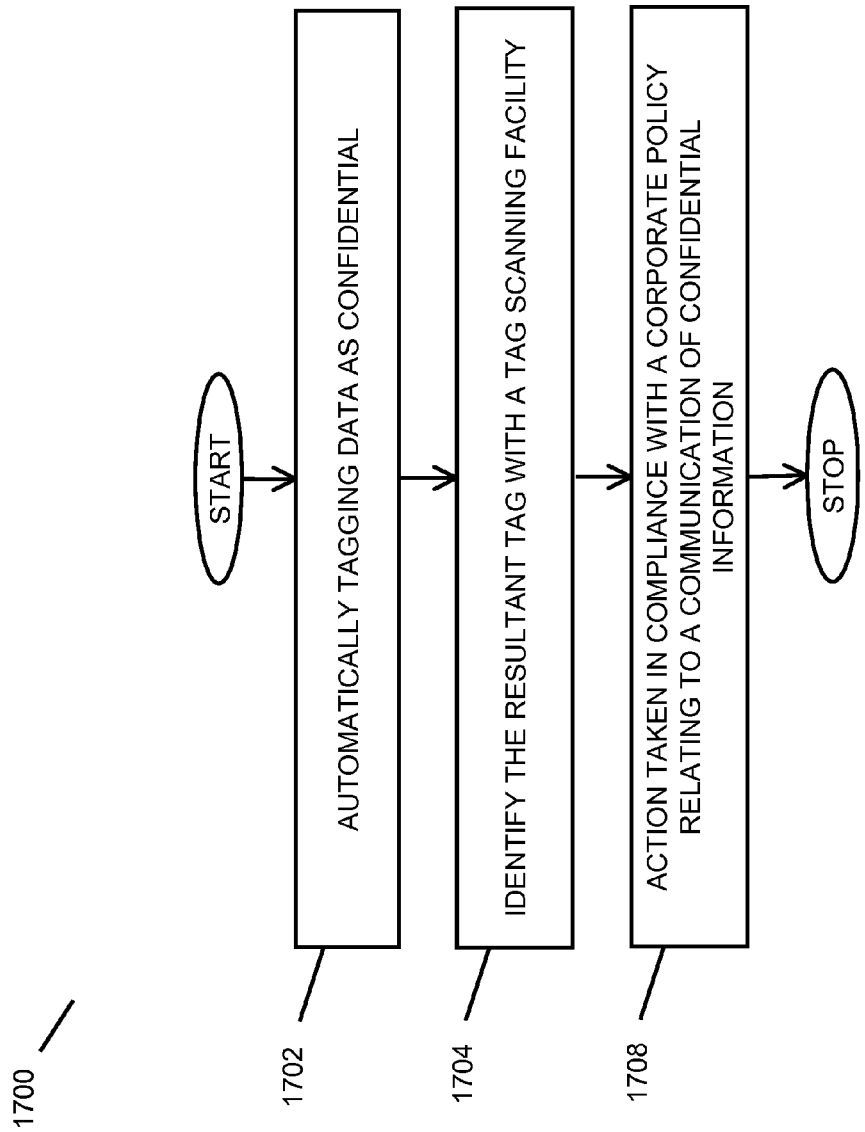
FIG. 17 depicts a process flow embodiment of the present invention for automatically tagging a document.

In an embodiment, FIG. 17 depicts a process flow embodiment 1700 of the present invention for automatically tagging a document. The tagged data may be automatically tagged as confidential 1702 such that a tag scanning facility identities a resultant tag 1704 and cause an action to be taken, such as in compliance with a corporate policy relating to a communication of confidential information 1708. In embodiments, automatic tagging may be applied based on a memory location where the data is stored, based on a scan schedule when files are scanned for the presence of confidential information, applied when the data is saved, and the like. In embodiments, the file may be tagged as confidential, non-confidential, confidential in nature, non-confidential in nature, and the like.

In embodiments, the present invention provides for the tagging of electronic data, and this tagged data may be detected by a scanning facility for enforcement of company policy regarding the transmission of electronic data. The system of tagging data within an enterprise 102 may be implemented in a flexible manner that establishes different policy for different categories of tags. In this way, the enterprise 102 may provide a custom tagging system that balances the need for data control against the freedom of transmission associated with the enterprise 102. In embodiments, the present invention may provide a reliable control of computer data that does not interfere with the normal intra-company communications.

Figure 18:
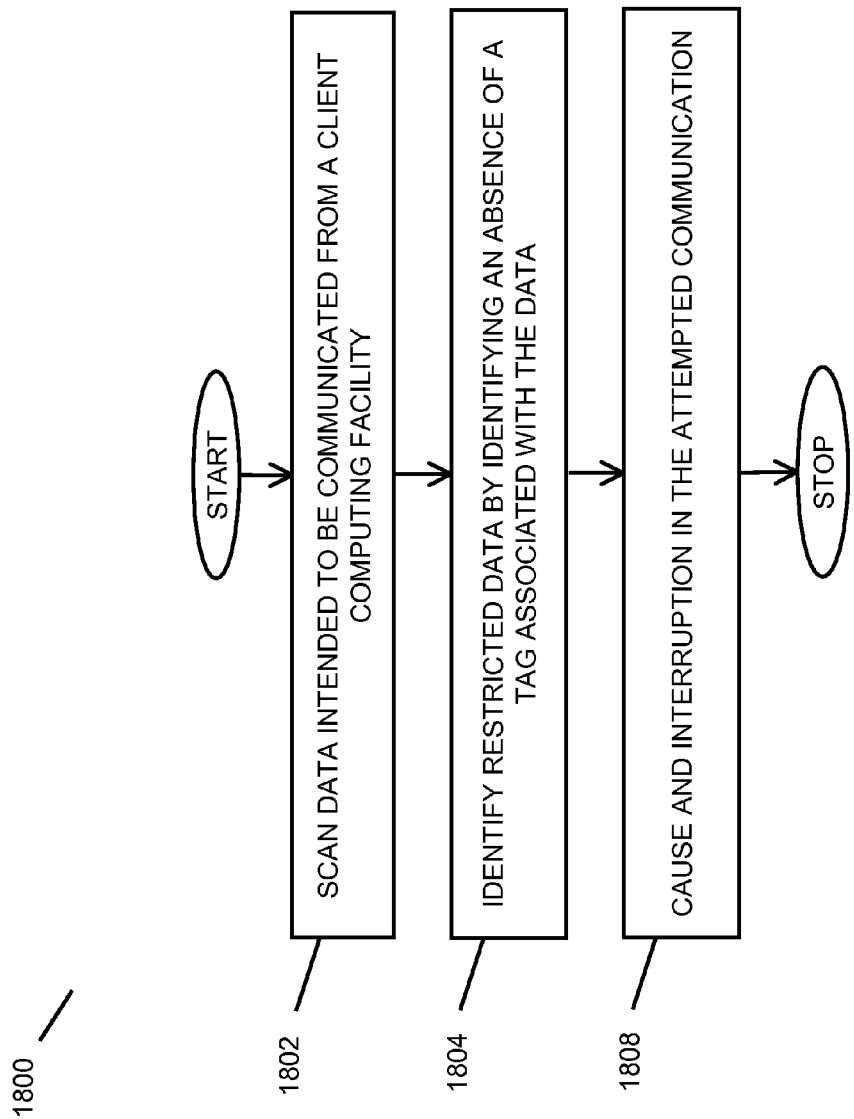
FIG. 18 depicts a process flow embodiment of the present invention for providing the interruption of data communication based on the absence of a tag.

In an embodiment, FIG. 18 depicts a process flow embodiment 1800 of the present invention for providing the interruption of data communication based on the absence of a tag. In embodiments, systems and methods according to the present invention may provide for a step A 1802, where data may be scanned that is intended to be communicated from the client computing facility. In embodiments, the data may be associated with a file. In response to step A, at step B 1804, restricted data may be identified by identifying an absence of a tag associated with the data. And finally, in response to step B, at step C 1808, an interruption to the intended communication may be caused. In embodiments, the scanning of step A may involve scanning data intended for an outside recipient, data intended for a non-employee recipient, data intended for a recipient outside of the corporate network, outgoing email, outgoing IMs, outgoing VoIP, data intended for a recipient represented on a block list of recipients, data intended to be transferred to a removable memory, data intended to be transferred to a memory stick, data intended to be transferred to an FTP site, and the like. In embodiments, the intended communication of step A may be associated with an intended transfer of the data from the client computing facility, and so step C may be associated with the interruption of the intended transfer.

In embodiments, if the tag is identified as associated with the data to be communicated, the tag may be analyzed to determine the communication protocol. The association of the tag with the data may be that the tag is attached to the data, the tag is associated with an attachment of metadata to the data, the association of the tag with the data modifies the filename associated with the data, and the like.

In embodiments, the present invention may provide a user interface that may facilitate the tagging of data with a confidentiality tag. Further, the tagging of data, such as on the client computing facility, may be based on an event. The event may be associated with the saving of a file, the automatic saving of a file, the saving of a file by the user, the creation of the file, the scanning of the file, the scheduled scanning of the file, and the like. In addition, the scanning process or scheduled scanning process may apply tags based on a parameter, such as folder location, content, filename, date, user name, user group, and the like.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer program product embodied in a non-transitory computer readable medium that, when executing on one or more computing devices, performs the steps of:
   scanning a number of data items on a client computing facility for target content, wherein the target content includes restricted data;
   tagging one or more of the data items that do not contain the target content with a tag that is cryptographically signed;
   scanning data that is intended to be communicated from the client computing facility;
   identifying the restricted data by identifying an absence of the tag associated with the data, thereby providing an identification; and
   in response to the identification, causing an interruption in the intended communication of the data according to an enterprise policy including one or more control restrictions placed on communications of data from the client computing facility.

2. The computer program product of claim 1, wherein scanning the data includes scanning all data intended for an outside recipient.

3. The computer program product of claim 1, wherein scanning the data includes scanning all data intended for a non-employee recipient.

4. The computer program product of claim 1, wherein scanning the data includes scanning all data intended for a recipient outside of a corporate network.

5. The computer program product of claim 1, wherein scanning the data includes scanning all outgoing email.

6. The computer program product of claim 1, wherein scanning the data includes scanning all outgoing IMs.

7. The computer program product of claim 1, wherein scanning the data includes scanning all outgoing VoIP.

8. The computer program product of claim 1, wherein scanning the data includes scanning all data intended for a recipient represented on a block list of recipients.

9. The computer program product of claim 1, wherein scanning the data includes scanning all data intended to be transferred to a removable memory.

10. The computer program product of claim 1, wherein scanning the data includes scanning all data intended to be transferred to a memory stick.

11. The computer program product of claim 1, wherein scanning the data includes scanning all data intended to be transferred to an FTP site.

12. The computer program product of claim 1, further comprising code that performs the step of selecting a secure communication protocol for the intended communication.

13. The computer program product of claim 1, wherein tagging the one or more data items includes attaching the tag to the data.

14. The computer program product of claim 1, wherein tagging the one or more data items includes attaching metadata to the data.

15. The computer program product of claim 1, wherein tagging the one or more data items includes the step of modifying the filename associated with the data.

16. The computer program product of claim 1, wherein the data comprises a file.

17. The computer program product of claim 1, further comprising providing a user interface on the client computing facility that facilitates a tagging of data with a confidentiality tag.

18. The computer program product of claim 1, wherein the tagging of data is automatically generated on the client computing facility based on an event.

19. The computer program product of claim 18, wherein the event is saving a file.

20. The computer program product of claim 19, wherein saving of the file is automatic.

21. The computer program product of claim 19, wherein saving of the file is initiated by a user.

22. The computer program product of claim 18, wherein the event is creating a file.

23. The computer program product of claim 18, wherein the event is a scheduled scanning process.

24. The computer program product of claim 23, wherein the scheduled scanning process applies tags based on folder location.

25. The computer program product of claim 23, wherein the scheduled scanning process applies tags based on data content.

* * * * *